(12) United States Patent
Greiff et al.

(10) Patent No.: US 7,390,962 B2
(45) Date of Patent: Jun. 24, 2008

(54) MICRON GAP THERMAL PHOTOVOLTAIC DEVICE AND METHOD OF MAKING THE SAME

(75) Inventors: Paul Greiff, Wayland, MA (US); Robert Stephen DiMatteo, Belmont, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 671 days.

(21) Appl. No.: 10/443,414

(22) Filed: May 22, 2003

(65) Prior Publication Data

US 2004/0231717 A1 Nov. 25, 2004

(51) Int. Cl.
*H01L 31/058* (2006.01)
(52) U.S. Cl. .......................... 136/253; 136/244
(58) Field of Classification Search ................. 136/253, 136/244
See application file for complete search history.

(56) References Cited

U.S. PATENT DOCUMENTS

| | | | |
|---|---|---|---|
| 5,075,763 A | * | 12/1991 | Spitzer et al. ............... 257/751 |
| 5,611,870 A | | 3/1997 | Horne et al. |
| 6,232,546 B1 | * | 5/2001 | DiMatteo et al. ............ 136/253 |
| 6,423,896 B1 | * | 7/2002 | Keegan ...................... 136/253 |
| 2006/0016471 A1 | | 1/2006 | Grieff |

OTHER PUBLICATIONS

DiMatteo et al., *Micron-gap ThermoPhotoVoltaics (MTPV)*, (2003) AIP Conf. Proc. 653, 232.

* cited by examiner

*Primary Examiner*—Nam X. Nguyen
*Assistant Examiner*—Jeffrey T Barton
(74) *Attorney, Agent, or Firm*—Iandiorio Teska & Coleman

(57) ABSTRACT

A method of making a micron gap thermal photovoltaic device wherein at least one standoff is formed on a photovoltaic substrate, a sacrificial layer is deposited on the photovoltaic substrate and about the standoff, an emitter is attached to the standoff and has a lower planar surface separated from the photovoltaic substrate by the sacrificial layer, and the sacrificial layer is removed to form a sub-micron gap between the photovoltaic substrate and the lower planar surface of the emitter.

45 Claims, 23 Drawing Sheets

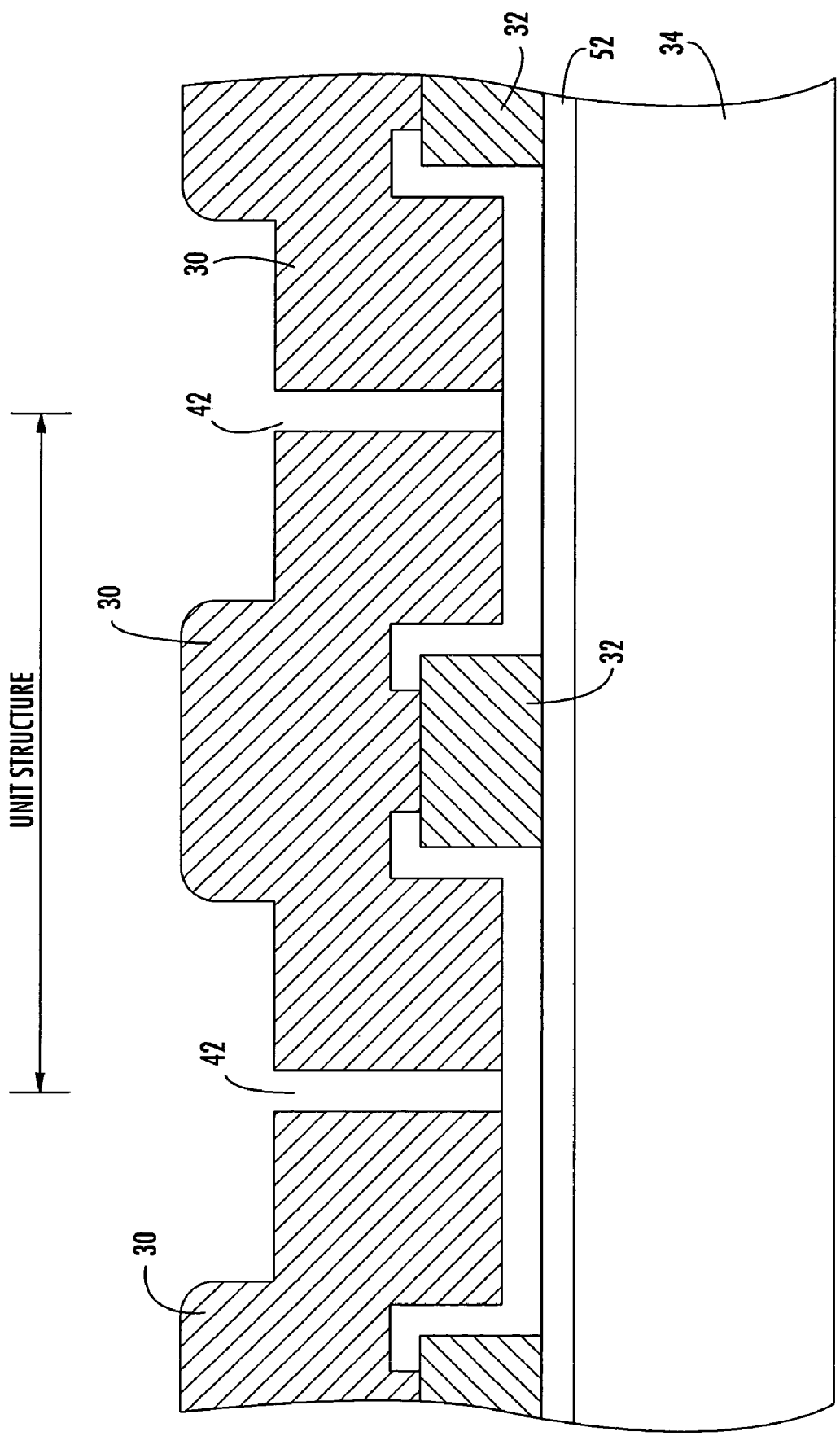

MICRON GAP THERMAL PHOTOVOLTAIC DEVICE AND METHOD OF MAKING THE SAME

FIELD OF THE INVENTION

This invention relates to thermal photovoltaic devices and more particularly to a microscale thermophotovoltaic generator.

BACKGROUND OF THE INVENTION

It has been shown that electromagnetic energy transfer between a hot and cold body is a function of the close spacing of the bodies due to evanescent coupling of near fields. Thus, the closer the bodies, approximately one micron and below, the greater the power transfer. For gap spacings of 0.1 microns, increases in the rate of energy transfer of factors of five and higher are observed.

The dilemma, however, is forming and then maintaining the close spacing between two bodies at a sub-micron gap in order to maintain enhanced performance. While it is possible to obtain the sub-micron gap spacing, the thermal effects on the hot and cold surfaces induce cupping, warping, or deformation of the elements resulting in variations in gap spacing thereby resulting in uncontrollable variances in the power output.

Typically, in order to increase power output, given the lower power density of prior art devices, it has been necessary to increase the temperature. Temperature increases, however, are limited by the material of the device and system components.

Micron gap thermal photovoltaic (MTPV) systems are a potentially more efficient way to use photovoltaic cells to convert heat to electricity. Micron gap thermal photovoltaic devices are an improved method of thermal photovoltaics which is the thermal version of "solar cell" technology. Both methods make use of the ability of photons to excite electrons across the bandgap of a semi-conductor and thereby generate useful electric current. The lower the temperature of the heat source, the narrower the bandgap of the semi-conductor must be to provide the best match with the incoming spectrum of photon energy. Only those photons with energy equal to or greater than the bandgap can generate electricity. Lower energy photons can only generate heat and are a loss mechanism for efficiency. A preferred micron gap thermal photovoltaic system would include a source of heat radiated or conducted to an emitter layer which is suspended at a sub-micron gap above the surface of an infrared sensing photovoltaic cell.

By using a sub-micron gap between a hot emitting surface and a photovoltaic collector, a more enhanced rate of transfer of photons from solid to solid is observed than is possible with large gaps. Additional transfer mechanisms are involved other than simply Planck's law of the radiation, although the spectral distribution of the photons is that of a black body. The use of sub-micron gaps, however, implies that a vacuum environment is used to avoid excessive heat conduction across the gap by low energy photons that cannot excite electrons into the conduction band. To make efficient use of the source of heat, a high fraction of high energy photons must be generated. The structure used to separate the emitting surface from the photovoltaic cell must be both small in diameter and also a very good thermal insulator for the same efficiency considerations. The photovoltaic cell will generally have to be cooled somewhat so that it will function properly. At high temperatures, intrinsic carrier generation swamps the PN junction and it is no longer an effective collector of electrons.

Micron gap thermal photovoltaic systems function as though the emitter has an emissivity value greater than one. The definition of a black body is that it has an emissivity value equal to one and this value cannot be exceeded for large gap radiant energy transfer. Equivalent emissivity factors of 5-10 have been experimentally demonstrated by the Assignees hereof using gaps in the region of 0.30 to 0.10 microns.

There are at least two ways to take advantage of this phenomenon. In a comparable system, if the temperature of the emitting surfaces is kept the same, the micron gap thermal photovoltaic system can be made proportionately smaller and cheaper while producing the same amount of electricity. Or, if a comparable size system is used, the micron gap thermal photovoltaic system will run at a considerably lower temperature thereby reducing the cost of materials used in manufacturing the system. In a preliminary estimate, it was calculated that by using micron gap technology the operating temperature of a typical system could be reduced from 1,400° C. to 1,000° C. and still produce the same output of electricity. Such a lowering of temperature could make the difference in the practicality of the system due to the wider availability and lower cost of possible materials.

Additional energy transfer mechanisms have been postulated and the ability to build systems using narrow thermally isolated gaps may find use in many types of applications in accordance with the subject invention.

In the Assignee's previous patent, U.S. Pat. No. 6,232,546, incorporated herein by this reference, an array of emitters was supported on a panel by flexures and the top surface of each emitter spaced from the photovoltaic element or cell by spacers formed on each emitter. The micron gap thermal photovoltaic devices constructed to date according to the disclosure of the '546 patent have typically been small chips four square millimeters in area and not particularly well suited for the generation of sufficient electrical power in some applications.

The initial multi-piece construction method of achieving small gaps was to build thin, small diameter spacers on an emitter "heater chip" structure, clean the photovoltaic cell and the heater chip, and then place them together in an attempt to eliminate dirt particles or waviness in the surface which would limit achieving the desired small gap. This manufacturing technique could be difficult to accomplish on large area devices with dimensions on the order of inches or even feet.

SUMMARY OF THE INVENTION

It is therefore an object of this invention to provide a novel micron gap thermal photovoltaic device structure which is also easier to manufacture.

It is a further object of this invention to provide such a micron gap thermal photovoltaic device which results in high thermal isolation between the emitter and the photovoltaic substrate.

It is a further object of this invention to provide such a micron gap thermal photovoltaic device which can have a large area and is capable of high yield.

It is a further object of this invention to provide such a micron gap thermal photovoltaic device which allows for lateral thermal expansion.

It is a further object of this invention to provide such a micron gap thermal photovoltaic device which is efficient.

It is a further object of this invention to provide such a micron gap thermal photovoltaic device with a uniform sub-micron gap.

It is a further object of this invention to provide such a micron gap thermal photovoltaic device which provides greater energy transfer.

It is a further object of this invention to provide such a micron gap thermal photovoltaic device which is constructed without assembling multiple discrete pieces.

It is a further object of this invention to provide a method of making a micro gap photovoltaic device.

It is a further object of this invention to provide a micron gap device useful as a thermal photovoltaic system and also useful in other applications.

This invention results from the realization a) that more uniform sub-micron gap thermal photovoltaic device which is easier to manufacture is effected by the use of a sacrificial layer between the emitters and their associated standoffs located right on the photovoltaic substrate and wherein the sacrificial layer is removed by chemical etching techniques to form the sub-micron gap between the lower planar surfaces of the emitters and the photovoltaic substrate thus eliminating the problems associated with multi-piece construction methods of the prior art; and b) that individual panels on one side (hot or cold) optionally connected by laterally compliant members, allows permanent connection of the center of these panels to the opposite side consistent with the sacrificial approach.

This invention features a micron gap thermal photovoltaic device typically comprising a photovoltaic substrate, a plurality of emitters separated from each other by a lateral gap and each having a lower planar surface closely spaced from the photovoltaic substrate defining a sub-micron gap between the photovoltaic substrate and the lower planar surface of each emitter. At least one standoff is formed upstanding from the photovoltaic substrate for each emitter supporting the emitter in a spaced relationship from the photovoltaic substrate.

There may be only a single standoff for each emitter centrally located with respect to the emitter. Alternatively, there are a plurality of standoffs upstanding from the photovoltaic substrate for each emitter. In one example, the photovoltaic substrate is made of InAs, InSb, GaSb, InP, or InGaAs and includes a silicon nitride coating thereon below the emitters. Typically, the emitters are made of a rigid material such as polysilicon. Each standoff is preferably made of a material which is thermally insulative such as silicon dioxide.

The photovoltaic substrate may have a perimeter ranging from a few inches to several feet, each emitter may have a perimeter ranging from less than a millimeter to several millimeters and a thickness of between 10 to over 100 microns, each standoff may have perimeter less than 300 microns and a height of between 1 to over 5 microns, and the sub-micron gap is typically between 0.01 to 1 micron.

In one example, the emitter is polygon shaped and has a stem section which resides on a standoff. In another example, each standoff has a central region and each emitter has an orifice over the central region of the standoff. In one embodiment, each standoff has a cup-like structure and an outwardly extending arcuate region attached to the emitter. The outwardly extending arcuate region may be attached to the emitter on a surface thereof opposite the lower planar surface of the emitter. Another emitter in accordance with this invention has a bellows-like construction. In another example, there are a plurality of floating standoffs extending from each emitter and spaced from the photovoltaic substrate.

The emitter may be coated with an absorptive layer such as carbon deposited on a surface thereof opposite the lower planar surface of the emitter. Moreover, the lower planar surface of the emitter may include an emissive layer made of a rare earth garnet material and, in addition, the photovoltaic substrate may include a spectral filter thereon adjacent the sub-micron gap.

One method of making a micron gap device (e.g., a thermal photovoltaic device) in accordance with this invention includes forming at least one standoff on a photovoltaic substrate, depositing a sacrificial layer on the photovoltaic substrate and about the standoff, forming an emitter attached to the standoff and having a lower planar surface separated from the photovoltaic substrate by the sacrificial layer, and removing (e.g., etching) the sacrificial layer to form a sub-micron gap between the photovoltaic substrate and the lower planar surface of the emitter.

In one embodiment, a plurality of emitters are formed each supported by at least one standoff and each separated from adjacent emitters by a lateral gap. Also, a plurality of standoffs for each emitter may be patterned to include a stem section which resides on the standoff. In another embodiment, the standoff is patterned to have a central region and the emitter is patterned to have an orifice over the central region of the standoff. In another example, the standoff is patterned to have a cup-like structure and an outwardly extending arcuate region attached to the emitter on a surface thereof opposite the lower planar surface of the emitter. Further included may be the step of forming a plurality of floating standoffs extending from each emitter and spaced from the photovoltaic substrate. In another example, the emitter is patterned to form a bellows-like structure.

Further included may be the step of coating the emitter with an absorptive layer such as carbon on a surface thereof opposite the lower planar surface of the emitter. Still further included may be the step of depositing an emissive layer on the lower planar surface of the emitter, and depositing a spectral filter on the photovoltaic substrate.

The step of forming the standoff may include depositing rigid material on the substrate, masking a portion of the rigid material, and etching the non-masked portion of the rigid material off the substrate. The step of depositing the sacrificial layer may include depositing the sacrificial layer on the substrate and over the emitter. The step of forming the emitter may include patterning the sacrificial layer to remove at least one portion of the sacrificial layer proximate the standoff and depositing emitter material on the sacrificial layer to contact the standoff at the removed portion of the sacrificial layer. The step of removing the sacrificial layer may include etching orifices in the emitter material down to the sacrificial layer to form lateral gaps and/or weep holes and employing an etchant through the orifices to remove the sacrificial layer. In one example, the orifices are positioned between adjacent emitters to serve as lateral gaps therebetween. Plasma etching may be used to form the lateral gaps and/or the weep holes.

The step of depositing the sacrificial layer may include depositing the sacrificial layer on the substrate and under a portion of the standoff. The step of forming the emitter then includes depositing emitter material on the sacrificial layer and over that portion of the standoff.

In one embodiment, the emitter is formed before the standoff is formed: a first sacrificial layer is deposited on the substrate, emitter material is deposited on the first sacrificial layer and patterned, and a second sacrificial layer is deposited on the substrate and at least partially about the emitter material. The standoff is then formed and both the first and second sacrificial layers are then removed.

In another example, a first sacrificial layer is deposited and patterned on the substrate, the standoff is formed, a second sacrificial layer is deposited and patterned on the substrate, the emitter is formed, and both the first and second sacrificial layers are removed.

A micron gap device in accordance with this invention features a substrate, at least one standoff formed on the substrate to be upstanding thereon, and at least one emitter attached to the standoff and having a lower planar surface separated from the substrate by a sacrificial layer which is removed to form a sub-micron gap between the lower planar surface of the emitter and the substrate. In the preferred embodiment, the substrate is a photovoltaic device, and there are a plurality of emitters separated from each other or, alternatively, the emitter is monolithic in construction.

A micron gap thermal photovoltaic device in accordance with this invention includes a photovoltaic substrate, at least one standoff formed on the photovoltaic substrate to be upstanding from the photovoltaic substrate, at least one emitter attached to the standoff and patterned to have a lower planar surface separated from the photovoltaic substrate by a sacrificial layer which is removed defining a sub-micron gap between the photovoltaic substrate and the lower planar surface of the emitter.

BRIEF DESCRIPTION OF THE DRAWINGS

Other objects, features and advantages will occur to those skilled in the art from the following description of a preferred embodiment and the accompanying drawings, in which:

FIGS. 6A-6F are schematic cross sectional diagrams depicting the primary steps associated with the method of manufacturing the micron gap thermal photovoltaic device shown in FIG. 5;

DISCLOSURE OF THE PREFERRED EMBODIMENTS

Figure 1:
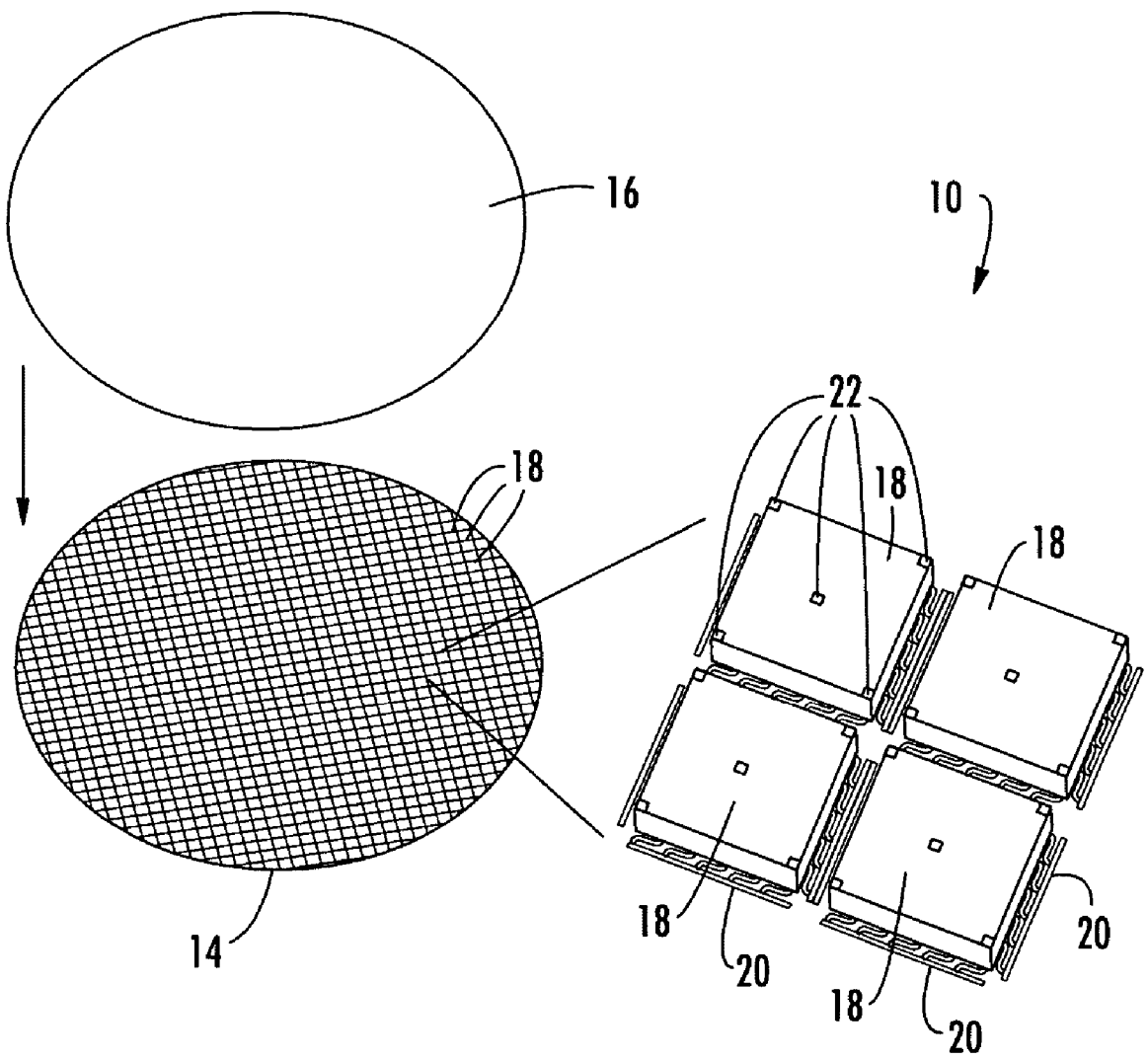
FIG. 1 is a schematic view showing the primary components associated with the hot side of a thermal photovoltaic generator in accordance with the Assignee's own prior art.

Thermal photovoltaic generator 10, FIG. 1, as disclosed in U.S. Pat. No. 6,232,546, includes emitters 18 on panel 14 supported thereon by flexors 20. The top surface of the emitters are spaced from photovoltaic device 16 by spacers 22 formed on each emitter. As such, photovoltaic device 16 and panel 14 must be joined together. Given that the gap between the top surface of each emitter and photovoltaic device 16 is typically less then one micron, particles can contaminate the resulting structure and topological surface variations and other surface defects can pose manufacturing difficulties. Moreover, the high temperatures associated with the emitters can cause deformation or breakage of the emitter/flexure/panel structures.

Figure 2:
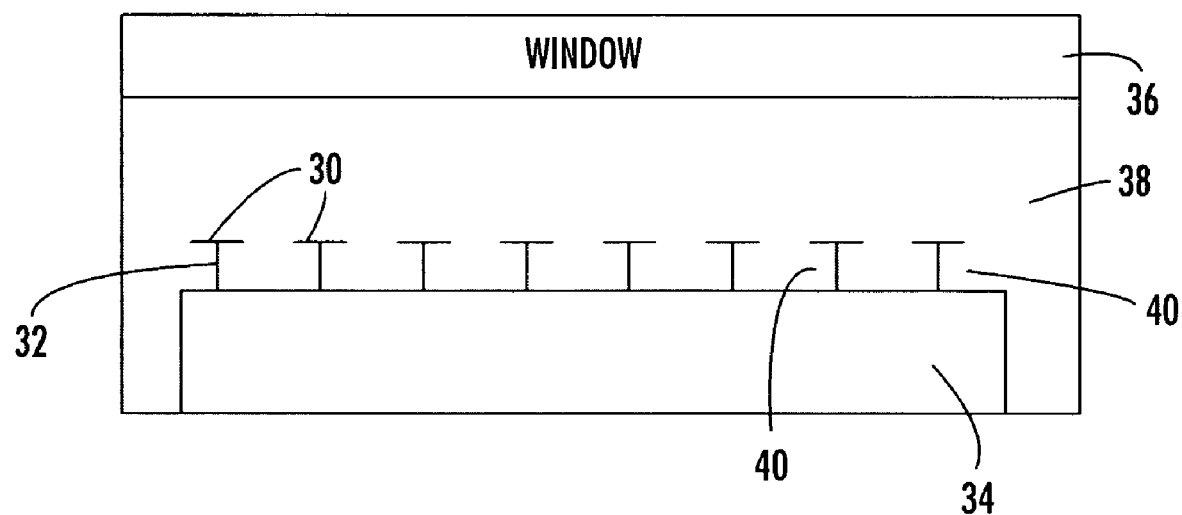
FIG. 2 is a schematic cross sectional view of a thermal photovoltaic generator in accordance with the subject invention.

In the invention described herein, the emitters 30, FIG. 2 and their standoffs 32 upstanding from photovoltaic substrate 34 are formed directly on photovoltaic substrate 34 using deposition, patterning, and etching techniques thus eliminating the need to conjoin the photovoltaic device with a panel having an array of emitters thereon thereby reducing many of the manufacturing difficulties associated with the multi-piece construction of the prior art shown in FIG. 1.

In FIG. 2, window 36 directs photons to emitters 30 within vacuum chamber 38. The sub-micron gap 40 between the lower planar surface of each emitter and photovoltaic substrate 34 results in an efficient micron gap thermal photovoltaic device. FIG. 2 and the figures which follow are not to scale and thus presented for explanation purposes only.

Figure 3:
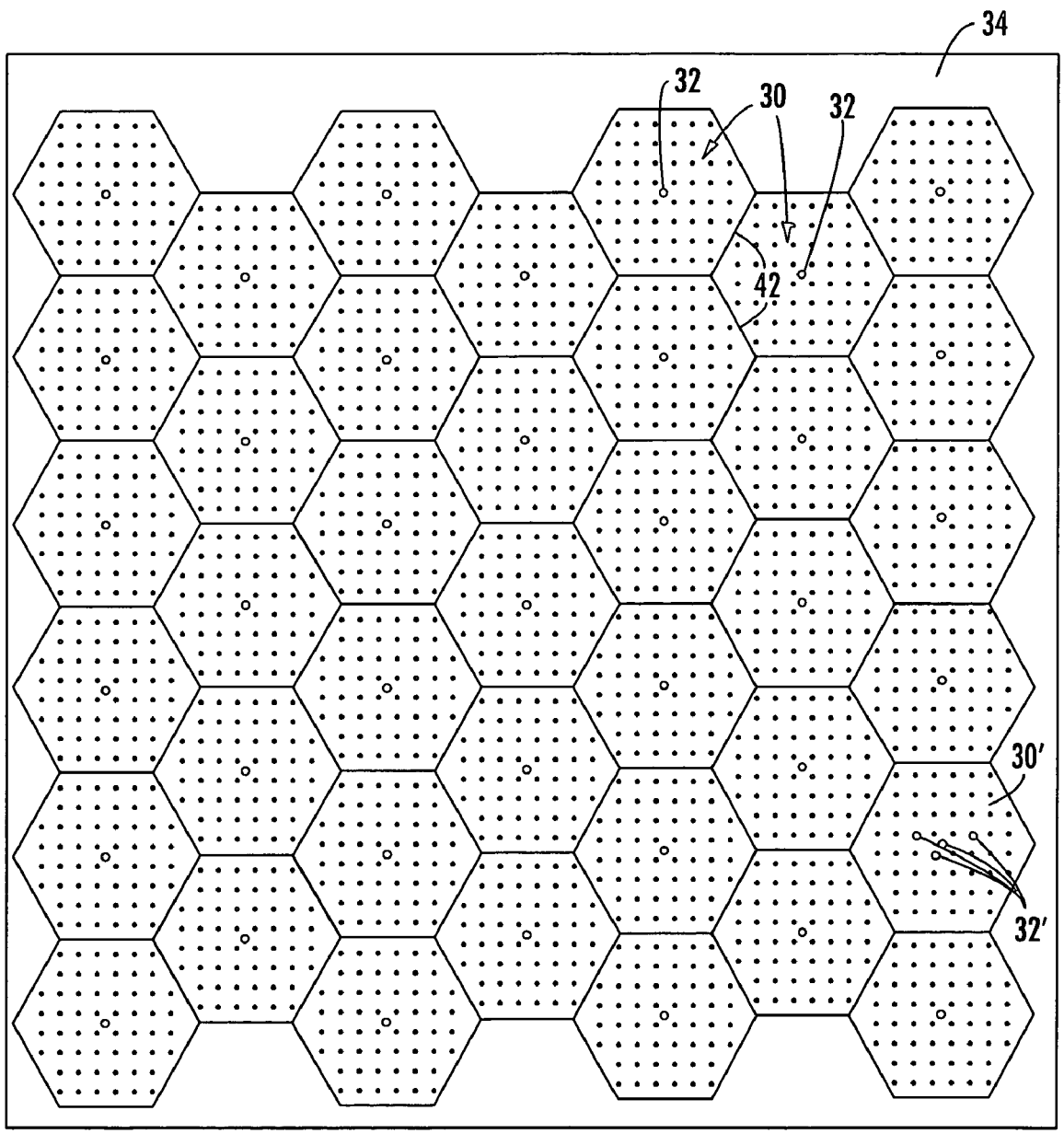
FIG. 3 is a schematic top view showing an array of emitters each supported by a centrally located standoff upstanding from a photovoltaic substrate.
Figure 4:
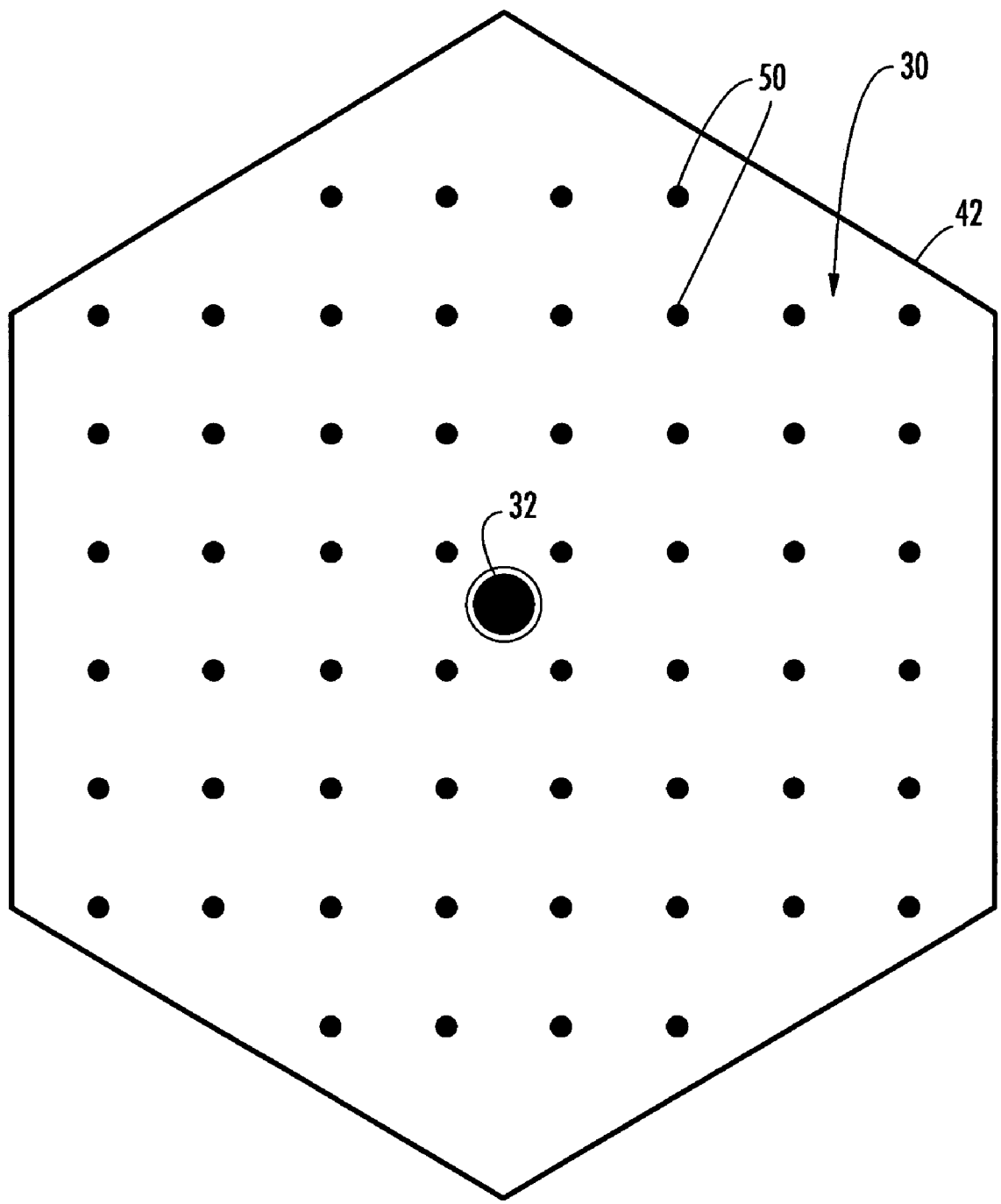
FIG. 4 is a schematic top view showing, in more detail, a single emitter of the array of emitters shown in FIG. 3.

FIG. 3 shows a plurality of six sided rigid polysilicon or similar emitters 30 spaced from each other as shown by lateral gaps 42 and supported on photovoltaic substrate 34 each by a single centrally located silicon dioxide standoff 32. A variety of materials can be used for the construction of these devices to conform to the following general characteristics. The material used for the standoffs should exhibit good thermal insulative characteristics. Photovoltaic substrate 34 may be round or square and may have a perimeter ranging in size from a few inches to several feet. In one example, photovoltaic substrate 34 is made of InAsSbP, InAs, or InGaAs or similar bandgap material including ternary or quartenary compounds with an optional silicon nitride coating for etchant protection. In other embodiments, there are a plurality of standoffs 32' for each emitter as shown for emitter 30'. The standoffs may be cylindrical with a typical diameter of between 4-20 microns and a typical height of between 1 to over 4 microns. Each emitter typically has a thickness of between 10 to over a hundred microns and a perimeter ranging from less than 1 mm to several millimeters (e.g., one half millimeter to 2 millimeters on a side). Each emitter can achieve temperatures of approximately 1,000° C. while photovoltaic substrate 34 is at ambient or a cooled temperature and yet thermal stresses which can cause failure are avoided in accordance with the subject invention. A single emitter 30 is shown in FIG. 4 supported by standoff 32. Weep holes 50, discussed infra, are also shown. The lateral gaps 42 between adjacent emitters may be 1 to 10 microns wide depending on the expected lateral expansion of emitter 30.

Figure 5:
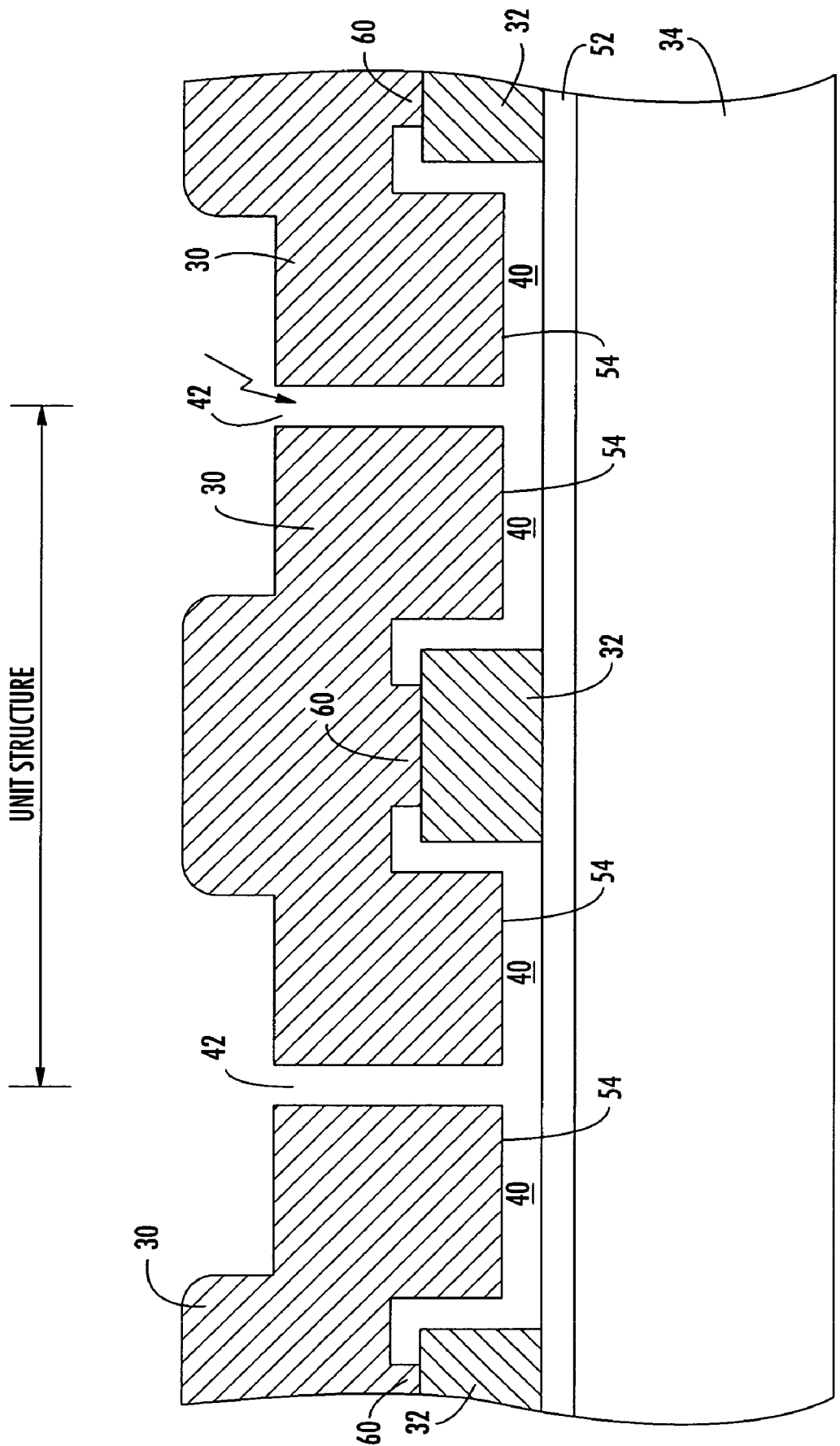
FIG. 5 is a schematic cross sectional view showing a portion of a micron gap thermal photovoltaic device of the subject invention.

In one embodiment, emitters 30, FIG. 5 are separated from each other by lateral gaps 42 and are each centrally supported by standoffs 32 defining sub-micron gap 40 between the lower planar surface 54 of each emitter and protective silicon nitride coating 52 of photovoltaic substrate 34. Gap 40 may range from less than 0.05 to 1 micron. In this particular embodiment, each emitter 30 has a stem portion 60 which resides on a portion of the top of each cylindrical standoff 32.

Figure 6A:
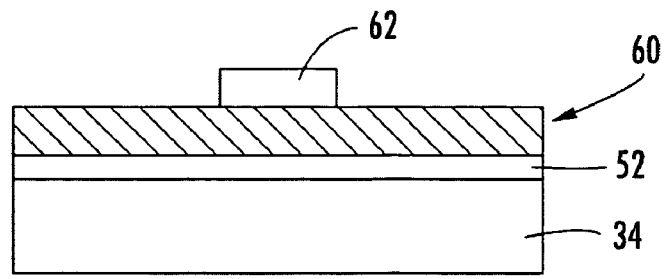
Figure 6B:
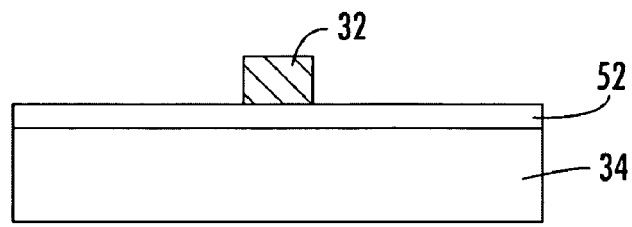

The primary steps associated with manufacturing the structure shown in FIG. 5 are depicted in FIGS. 6A through 6F. FIGS. 6A through 6B show the formation of standoff 32 on photovoltaic substrate 34. Silicon dioxide material is deposited to a thickness of one to four microns on optional silicon nitride coating 52 as shown at 60, FIG. 6A and patterned using mask 62 using photolithography and etching technique to form cylindrical standoff 32, four to twenty microns in diameter.

Figure 6C:
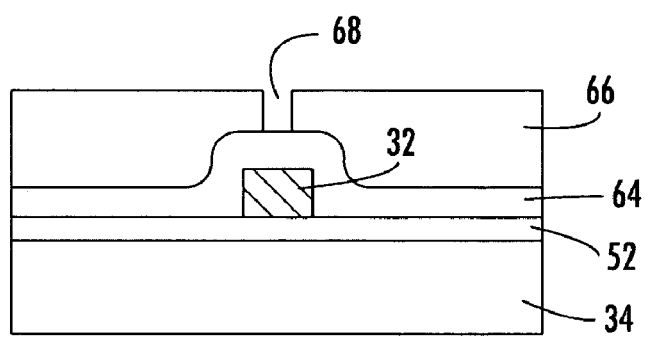
Figure 6D:
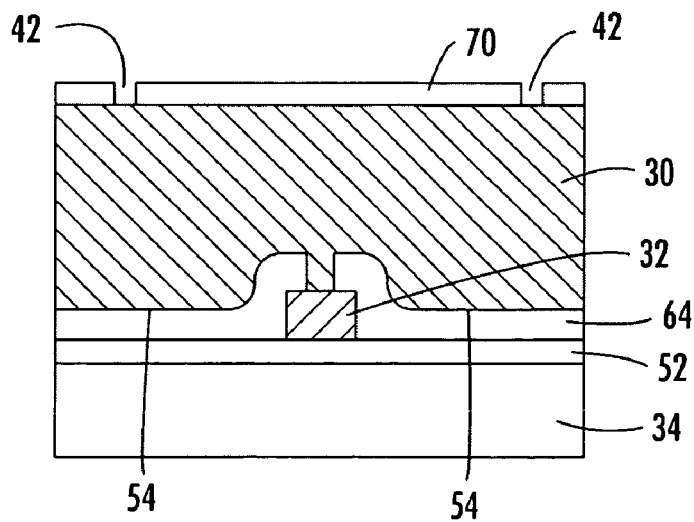
Figure 6E:
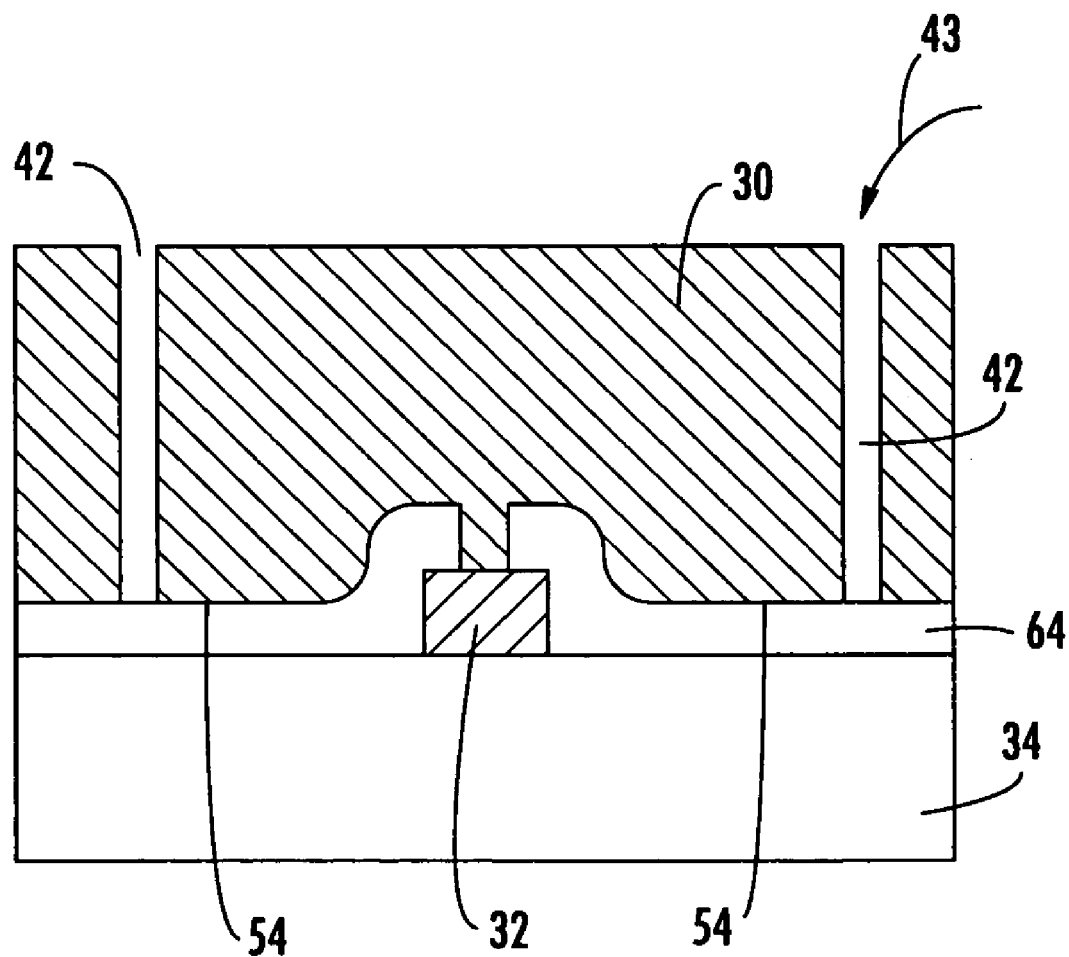

Next, FIG. 6C, less than 0.05 to 1 micron thick sacrificial layer 64 is deposited on coating 52 and about (e.g., over) standoff 32. The material used for sacrificial layer 64 should exhibit good structural integrity, be selectively etchable, and not react chemically with any other materials used in the process. In one example, germanium films are used for sacrificial layer 64.

Next, sacrificial layer 64, FIG. 6C is patterned using photoresist material 66 and photolitographic and etching techniques are used to provide openings on the top of standoff 32 as shown at 68 to serve as the attachment point of the emitter layer to standoff 32. After the sacrificial layer is etched away at portion 68, the photoresist material 66 is removed, and polysilicon emitter layer 30 is deposited, FIG. 6D to a thickness of 10 to over 100 microns. The emitter layer material should be chosen such that it remains structurally rigid after formation of the gap. It must also maintain the desired gap without excessive distortion during operation when it is heated to operating temperatures which may reach 400 to 1,000° C.

Next, photoresist layer 70 is used to pattern emitter layer 30 and to form lateral gaps 42 and, optionally, weep holes (see 50, FIG. 4). In patterning the emitter layer, forming the lateral gaps, and forming the weep holes, is advantageous to use a material which can be anisotropically etched to maintain narrow lateral separations. Typically, plasma etching techniques are used to form lateral gaps 42, FIG. 6E due to their high aspect ratio. At this stage in the processing, the substrate wafer may be cut to provide a plurality of devices each with a number of emitters (see FIG. 3). As shown for emitter 30, FIGS. 6E through 6F, all the emitters are now formed attached to their respective standoffs 32 and each has lower planar surface 54 separated from substrate 34 by sacrificial layer 64.

Next, sacrificial layer 64 is removed by selective etching techniques. The space formally occupied by sacrificial layer 64 will become the gap across which the photon transfer takes place. A typical selective etching for the example shown above is a mixture of NH4OH and H2O2. These chemicals do not attack silicon dioxide, silicon, or silicon nitride at room temperature so that the relatively long etch times required to etch out the germanium through narrow gap 42 will not harm the rest of the structure. The chemical etching material is delivered to the sacrificial layer via lateral gaps 42 (and the optional weep holes) as shown by vector 43.

This sacrificial approach uniquely results in an emitter structure with a built in sub-micron gap directly on the surface of the photovoltaic cell. Note in FIG. 1 that the gap is between the top of each emitter and photovoltaic layer 16. In contrast, in this invention, a uniform and very narrow gap is achieved by first depositing the sacrificial thin film layer and then later removing it after the emitter has been deposited over the sacrificial thin film layer and the desired standoff structures have been completed and fixed to the surface of the photovoltaic cell. This novel method of construction is much more forgiving with respect to particles, topological surface variations and other surface defects. The use of the sacrificial layer used to form the photon gap can be used to form unsealed but also sealed surfaces. In the simpler situation when the heat source is radiant, an unsealed surface may be provided. The emitter portion is typically built as a grouping of discrete structures so as to mostly bypass the issue of lateral thermal expansion. This arrangement also gives the simplest arrangement with respect to a vacuum enclosure since the entire structure is placed in a vacuum enclosure with a transparent window as shown in FIG. 2. By maintaining small lateral gaps between the discrete structures, most of the incident radiation falls on the emitter structure and is efficiently used.

If, however, the source is a hot fluid, then the emitter surfaces must be hermetically sealed to separate the heating fluid from the required vacuum interface at the emitter to cell gap. This may be conveniently accomplished by connecting the emitters with a bellows like configuration as discussed infra with respect to FIGS. 12A-12B. This structure allows for lateral thermal expansion and hermetic sealing to maintain the vacuum interface. In addition, the structure can deform vertically to accommodate particulate contamination.

The thermal insulation requirements for the standoff are severe and one method of constructing them is to use a single standoff as discussed above to separate the emitters from the photovoltaic cell. This construction has the advantage of low thermal losses and minimum stress considerations. Another arrangement would be to have three or more standoffs per emitter as shown for emitter 30', FIG. 3 to provide a more rugged device but with a proportionately higher heat loss and also the introduction of some lateral expansion stresses.

Preferably, all deposition and etches are accomplished without detriment to the underlying photovoltaic cell. Depending on the photovoltaic material of choice, this limitation is frequently that of maintaining temperatures below approximately 400° C. to 600° C. where some types of photovoltaic cells begin to decompose. All deposited materials should also be capable of being patterned to the appropriate geometry. Patterning the standoff may require the use of lift-off techniques where the standoff material does not have a suitable etchant. The standoff material should be a good thermal insulator as well. The sacrificial layer should be selectively etchable without excessive etching of other materials. Long etch times may be required for complete removal. Note that FIG. 5 and the other figures are not to scale. In practice, standoff 32, FIG. 5 only occupies a small portion of the unit cell. FIG. 5 is also not to scale in the vertical direction and the weep holes discussed above are not shown in any of the following cross sections.

In any embodiment, however, a more uniform sub-micron gap thermal photovoltaic device which is easier to manufacture is effected by the use of a sacrificial layer or layers between the emitter or emitters and their associated standoffs upstanding from the photovoltaic substrate which is removed by chemical etching techniques to form the sub-micron gap between the lower planar surfaces of the emitters and the photovoltaic substrate thus eliminating the problem associated with the multi-piece construction methods of the prior art.

Figure 7A:
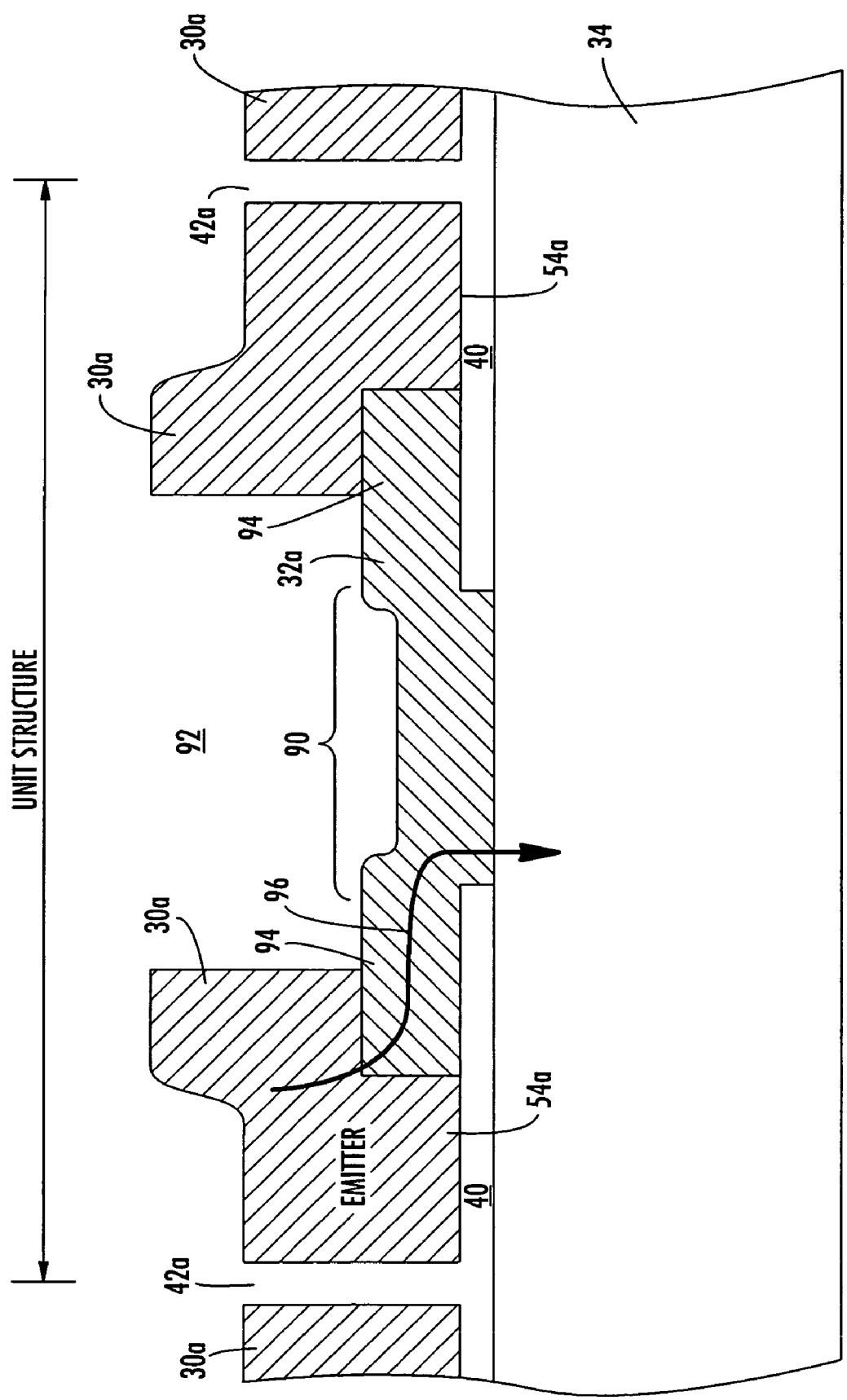
FIG. 7A is a schematic cross sectional view showing a portion of another embodiment of a micron gap thermal photovoltaic device in accordance with the subject invention.
Figure 7B:
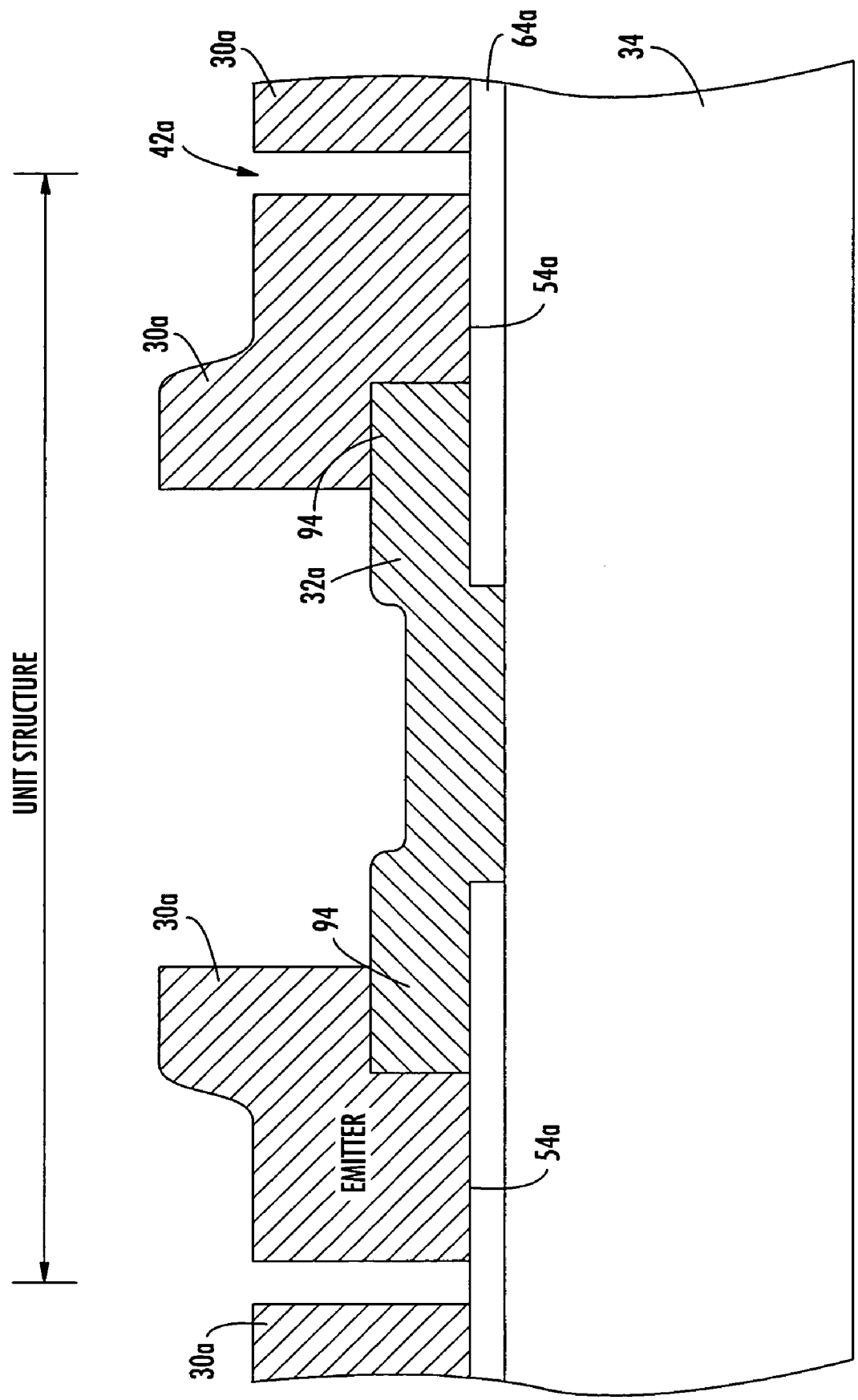
FIG. 7B is a view of the embodiment shown in FIG. 7A just before the sacrificial layer is removed.

In FIG. 7A, standoff 32a has central region 90 devoid of emitter material and thus each emitter has an orifice 92 over central region 90. Standoff 32 has a cup or mushroom-like structure and outwardly extending arcuate region or lateral portion 94 to which each emitter 30a is attached as shown. Improved thermal resistance is thus achieved in this design by forcing heat flow along lateral portion 94 as shown by vector 96. This design has the advantage of allowing a large contact area for adhesion of standoff 32a to cell 34 and, in this example, the sacrificial layer is deposited and patterned prior to the standoff layer. FIG. 7B shows the step in the assembly of the design of FIG. 7A just before sacrificial layer 64a under arcuate region 94 of standoff 32a and under the planar surface of each emitter is removed. Otherwise, the processing steps associated with the design of FIG. 7A is similar to the steps associated with FIGS. 6A-6F except that the emitter material is patterned on the sacrificial layer 64a and over arcuate region 94 of standoff 32a.

Figure 8A:
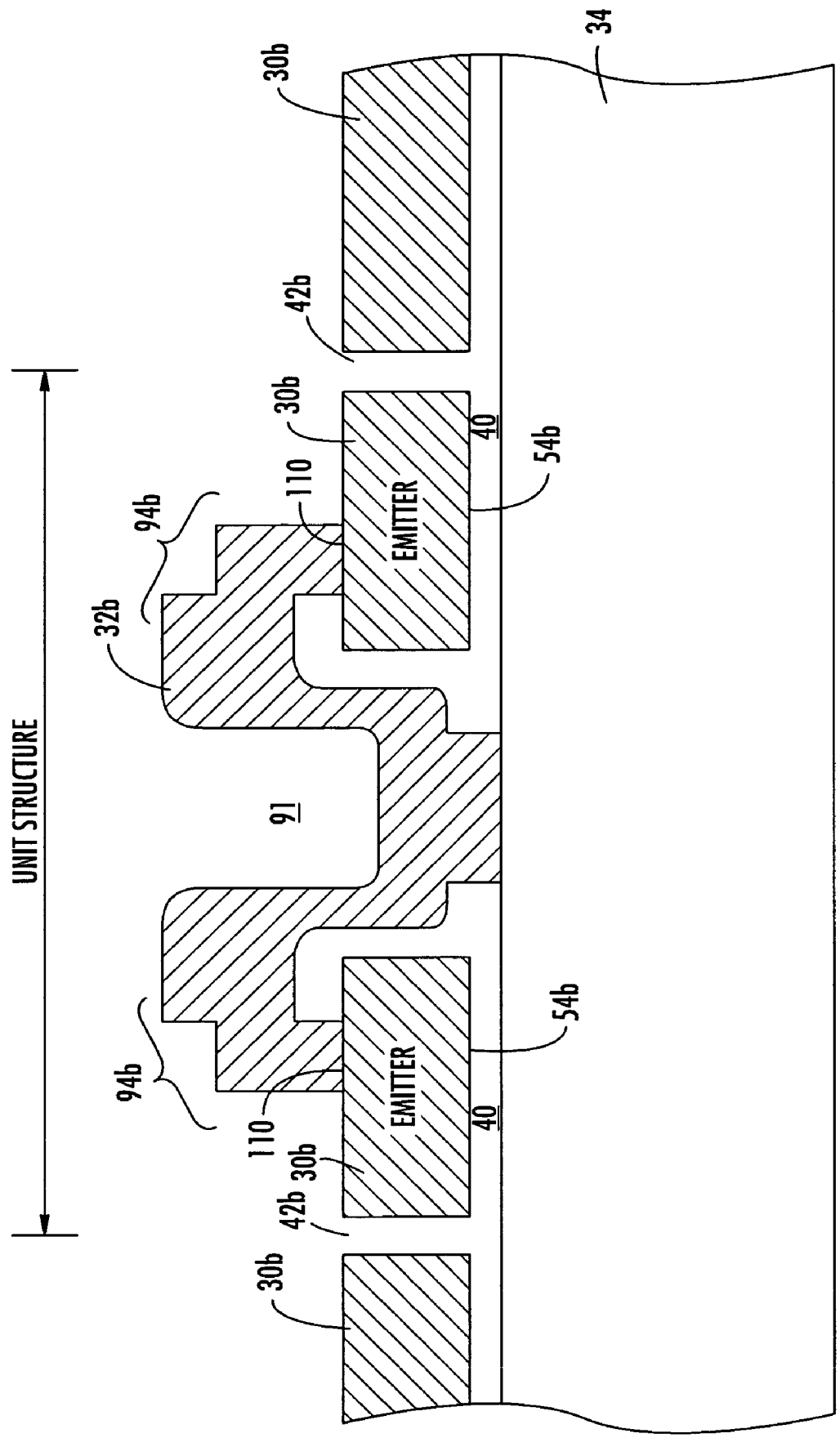
FIG. 8A is a schematic cross sectional view showing a portion of another embodiment of a micron gap thermal photovoltaic device in accordance with the subject invention.
Figure 8B:
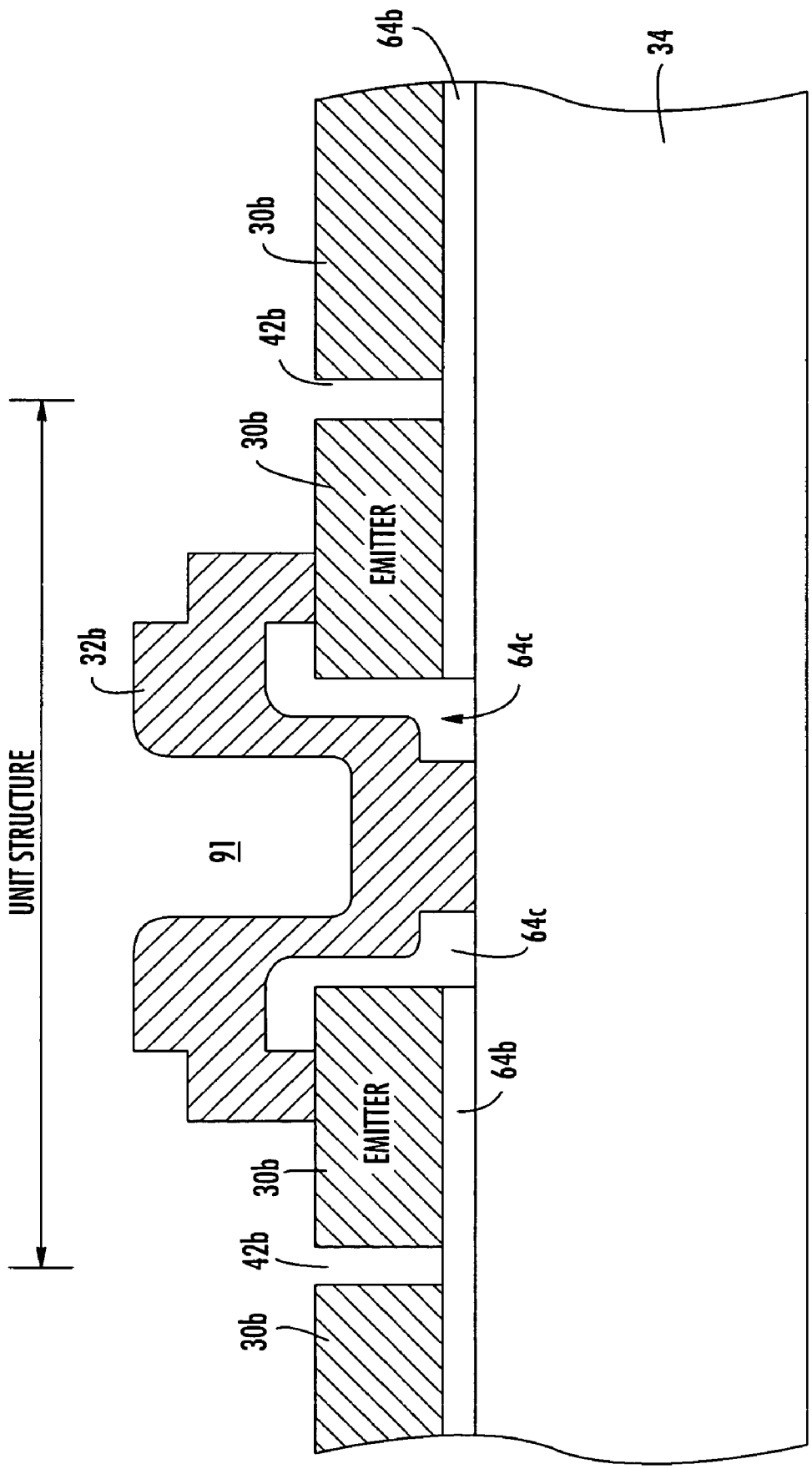
FIG. 8B is a schematic view showing the use of two sacrificial layers used to form the device of FIG. 8A.

In the design of FIG. 8A, two sacrificial layers 64b, 64c, FIG. 8B are used and standoff 32b is formed after emitter 30b. The typical fabrication process sequence is the deposition and patterning of sacrificial layer 64b, FIG. 8B, the deposition of emitter layer 30b, patterning of emitter layer 30b, patterning a window for standoff 32b, etching down through both the emitter and sacrificial layers, deposition of second sacrificial layer 64c and patterning it as shown in FIG. 8B so that it will thermally isolate standoff 32b. Second sacrificial layer 64c can be of different thickness than first sacrificial layer 64b and of a different material if desired. Finally, standoff 32b is deposited and patterned. In this case, the shape of standoff of 32b is a cup-like structure which allows the use of a larger geometry for an equivalent thermal resistance. Standoff 32b "grabs" emitter layer 30b from above as shown and a comparatively large area may be used to improve adhesion without creating thermal problems. Also, a large area may used to adhere standoff 32b to the photovoltaic cell as there is no emitter material above opening 91, FIG. 8A, to act as a parasitic heat source to photovoltaic cell 34. The mechanical ruggedness of the cup-like structure allows for a more favorable height to width ratio for higher thermal resistance.

The design of FIGS. 8A and 8B also has important applications in that it can be used with quantum well devices where the photovoltaic, sacrificial, and emitter layers are all grown as separately doped regions of a single crystal structure. In this case, the layers should be grown in an uninterrupted sequence in order to preserve the single crystal nature of the device. Standoff 32b, placed as a last step in this process, allows for uninterrupted sequencing while preserving the thermal isolation requirements. Quantum well structures improve the efficiency of micro gap thermal photovoltaic devices and examples of materials used in such structures are InGaAs for emitter 30b and photovoltaic substrate 34 and InP for sacrificial layers 64b and 64c. InP is a lattice match to the InGaAlAs to allow single crystal growth but can be selectively etched as required. This process is also applied to the use of a layered single crystal structure where the main purpose is to achieve a very small gap without consideration of quantum effects.

As shown in FIGS. 8A-8B, the result is a cup-like standoff 32b with outwardly extending arcuate region 94b attached to emitter 30b on surface 110 thereof opposite lower planar surface 54b.

Figure 9A:
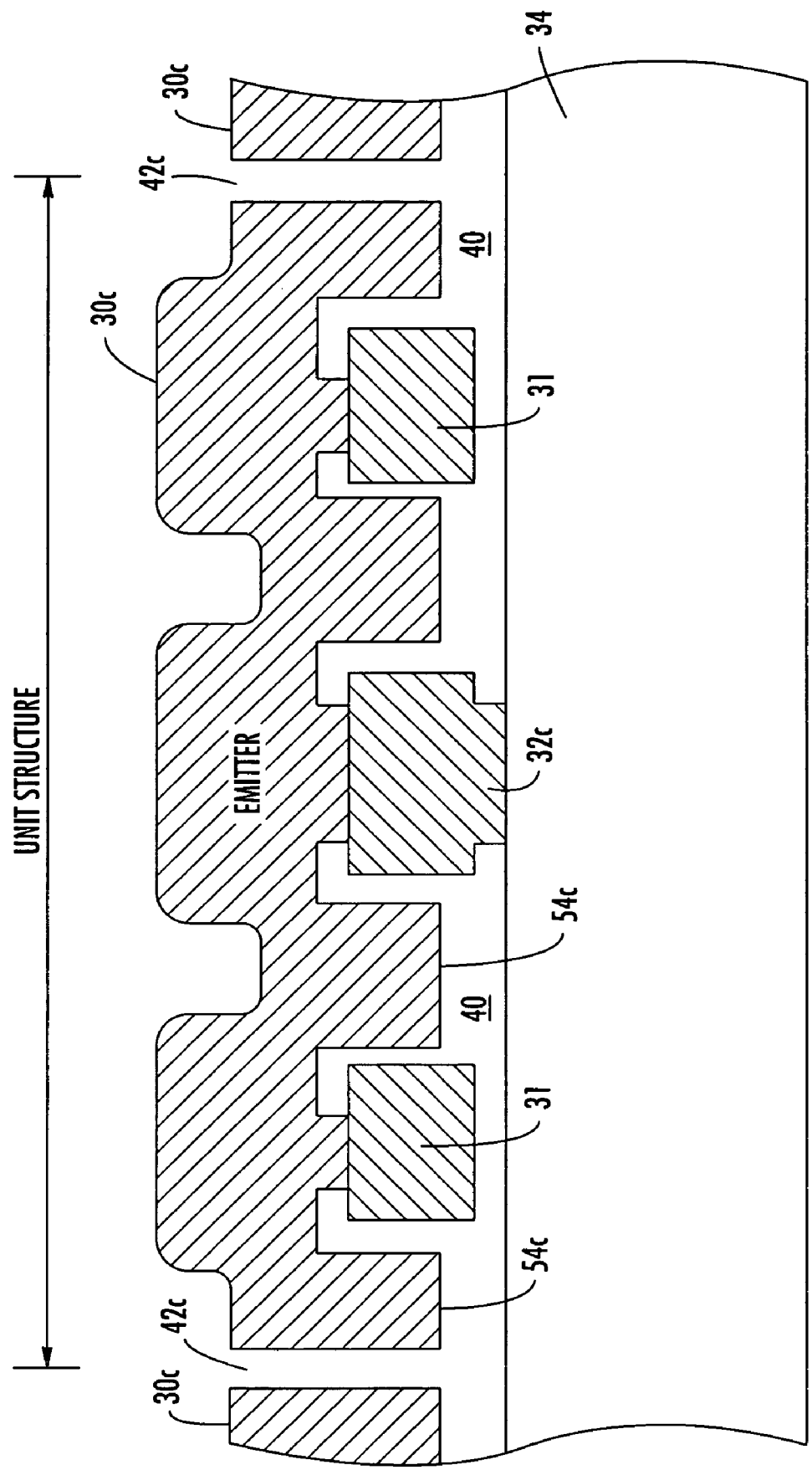
FIG. 9A is a schematic cross sectional view of a portion of still another embodiment of the micron gap thermal photovoltaic device of the subject invention.
Figure 9B:
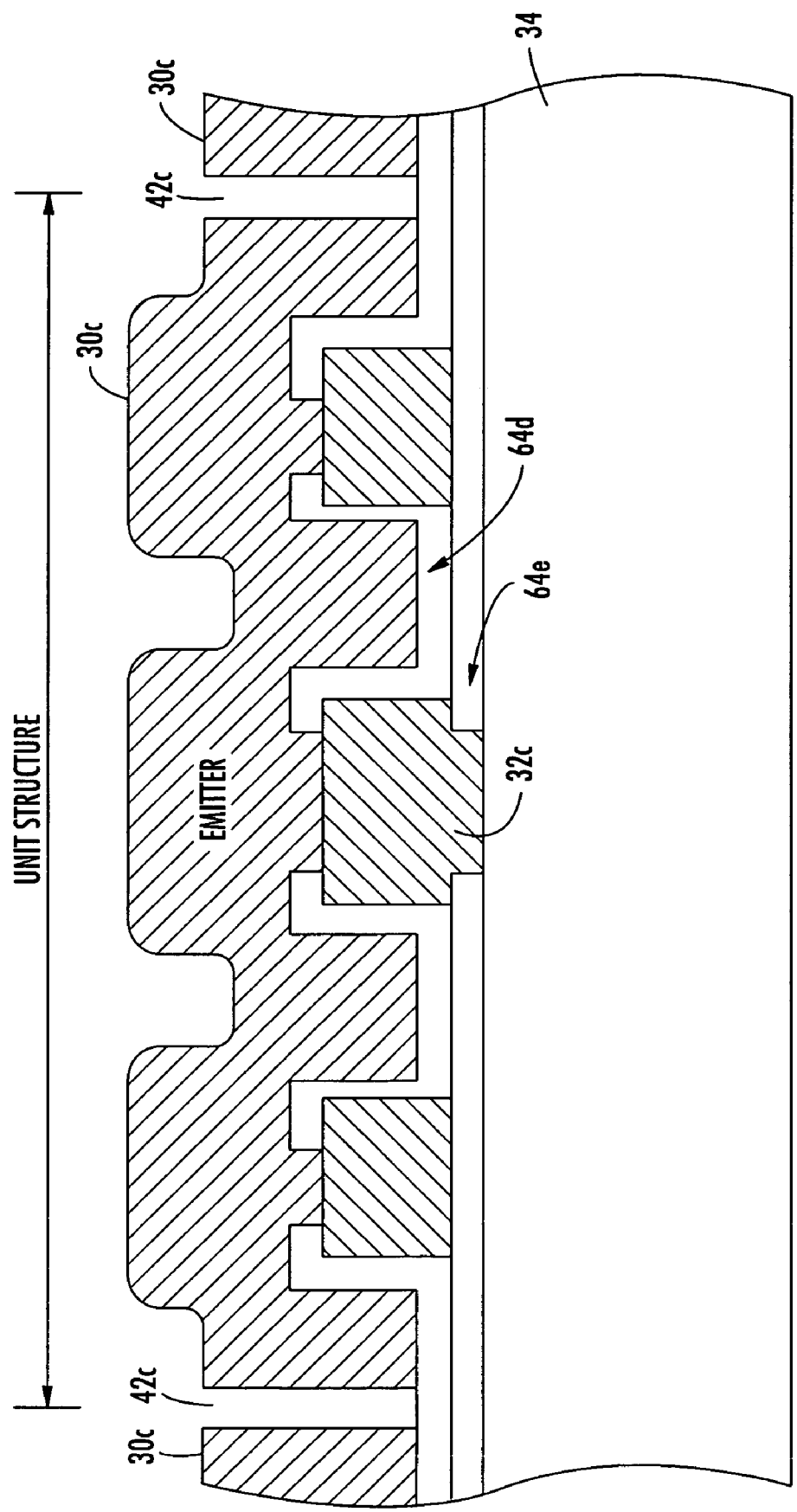
FIG. 9B is a view similar to FIG. 9A just before the two sacrificial layers used to manufacture the device of FIG. 9A are removed.

In the design of FIG. 9A, the resulting structure provides mechanical stability with respect to emitter tipping but minimizes the thermal losses through the standoffs. First sacrificial layer 64e, FIG. 9B is very thin, typically about 200 angstroms. Second sacrificial layer 64d is thicker. Only central standoff 32c is anchored to photovoltaic cell 34: floating standoffs 31 freely hang from the bottom surface of emitter 30c. Floating standoffs 31 support emitter 30c when it tips due to mechanical strain and they then provide mechanical support and prevent thermal shorting. In the absence of strain, floating standoffs 31 do not touch photovoltaic cell 34 and thus are not a factor thermally.

Figure 10A:
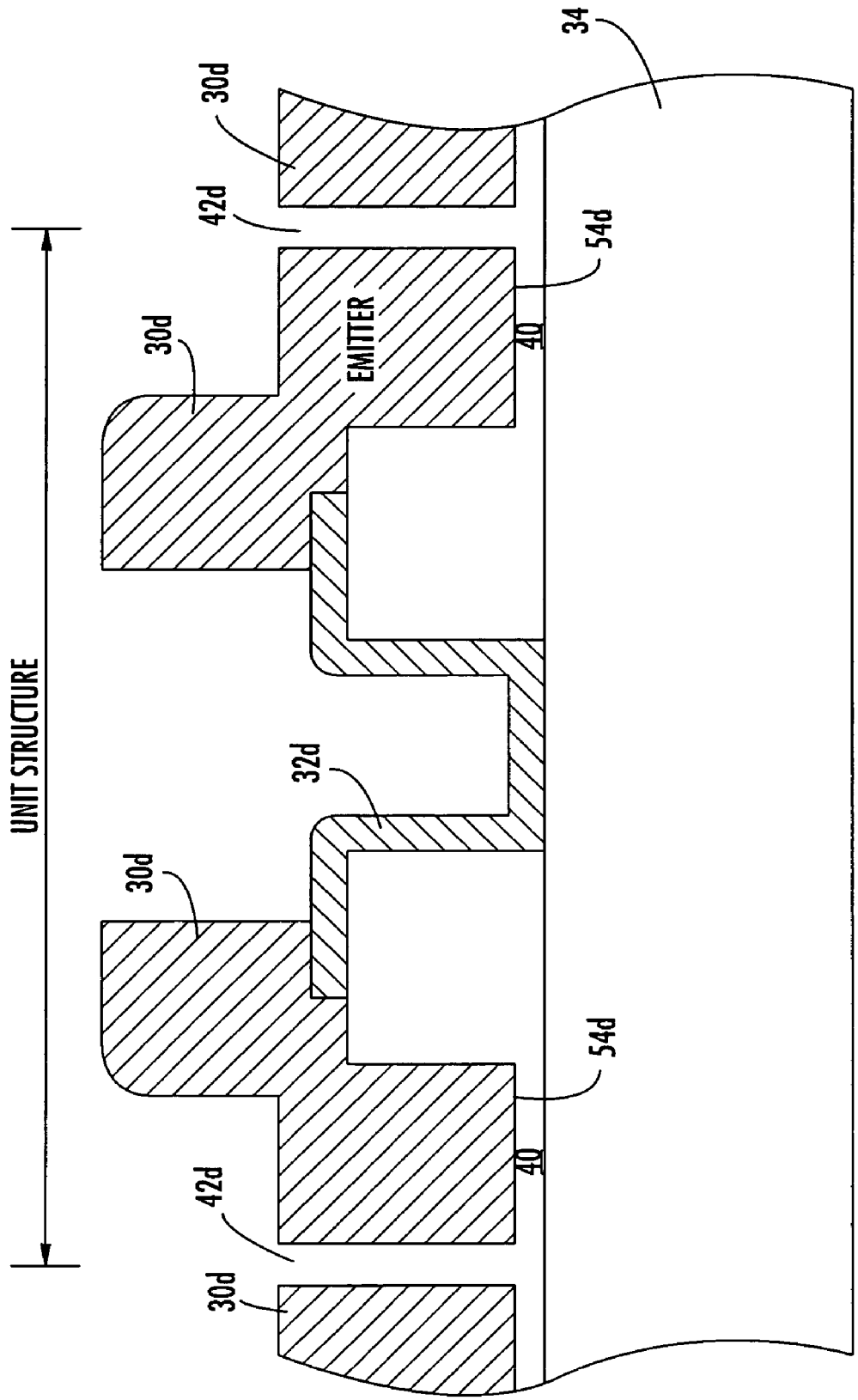
FIG. 10A is a schematic cross sectional view of a portion of still another micron gap thermal photovoltaic device in accordance with the subject invention.
Figure 10B:
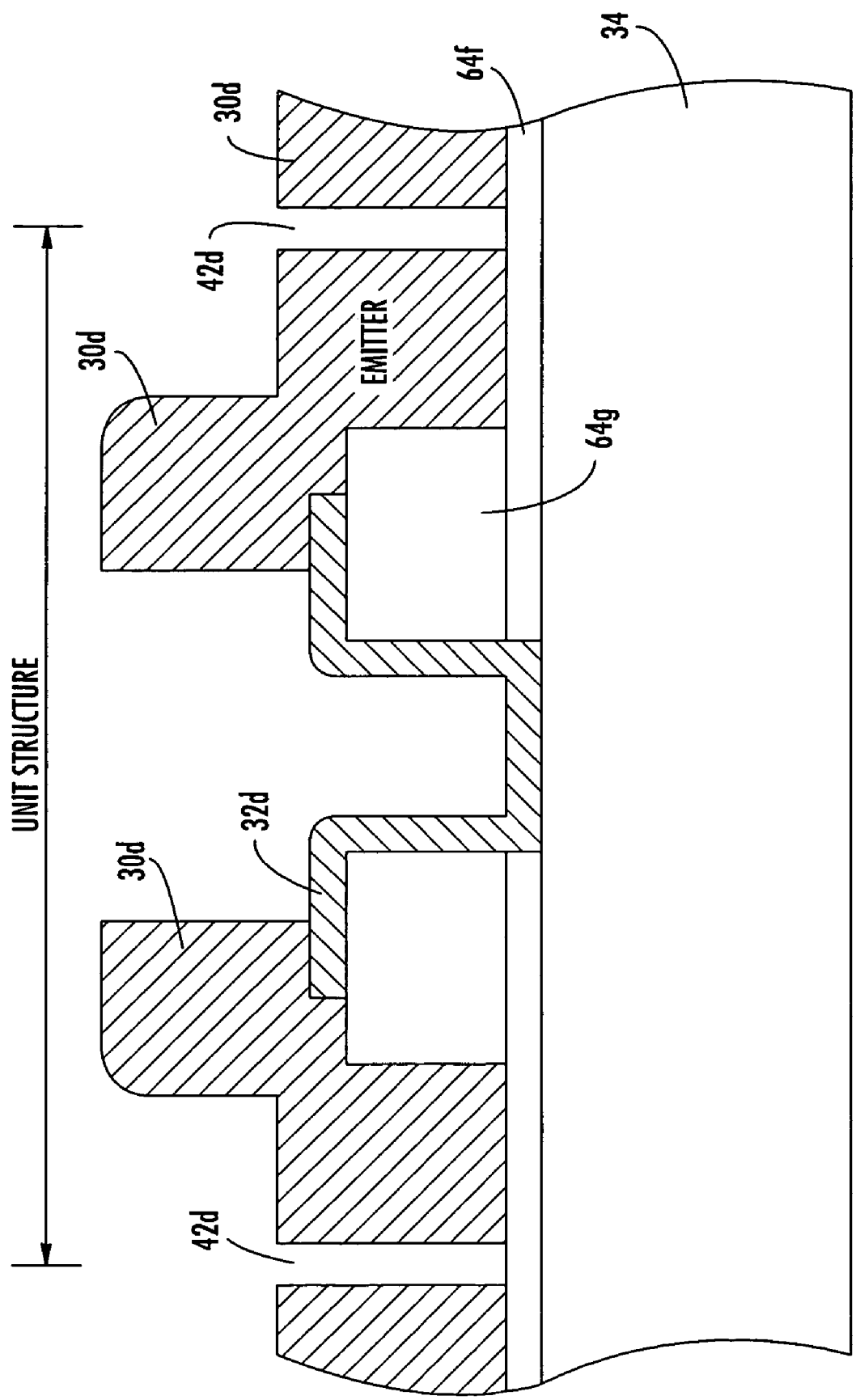
FIG. 10B is a schematic cross sectional view showing the use of a sacrificial layer in accordance with the method of manufacturing the micron gap thermal photovoltaic device of FIG. 10A.

In the design of FIGS. 10A and 10B, two sacrificial layers 64f and 64g, FIG. 10B, are used to create cup-shaped standoff 32d. For a given cross sectional area, which determines thermal resistance, the cup-shape of standoff 32d has a greater mechanical stability than a solid cylindrical standoff. Also, the bottom portion of standoff 32d may be extended to provide greater area for adhesion to photovoltaic cell 34 without significantly affecting the thermal resistance of standoff 32d. In addition to the layers shown, an etch stop layer may be required to pattern sacrificial layer 64g, FIG. 10B over sacrificial layer 64f.

One method of plugging the weep holes involves using a shadow mark and deposit emitter material in a vacuum at an oblique angle to the weep holes. A plate with a hole is an example of a shadow mask.

Figure 11A:
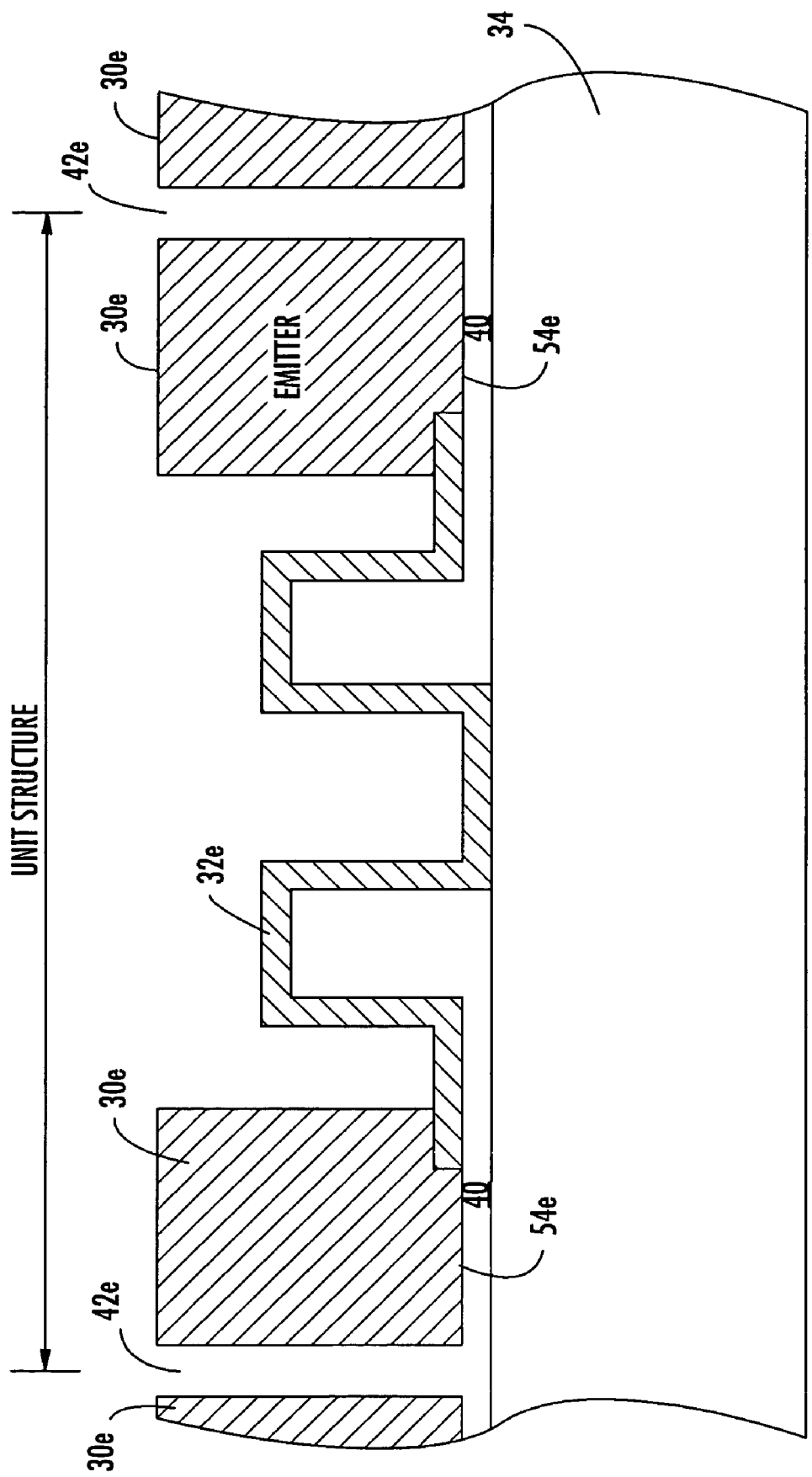
FIG. 11A is a schematic view of a portion of still another micron gap thermal photovoltaic device in accordance with the subject invention.
Figure 11B:
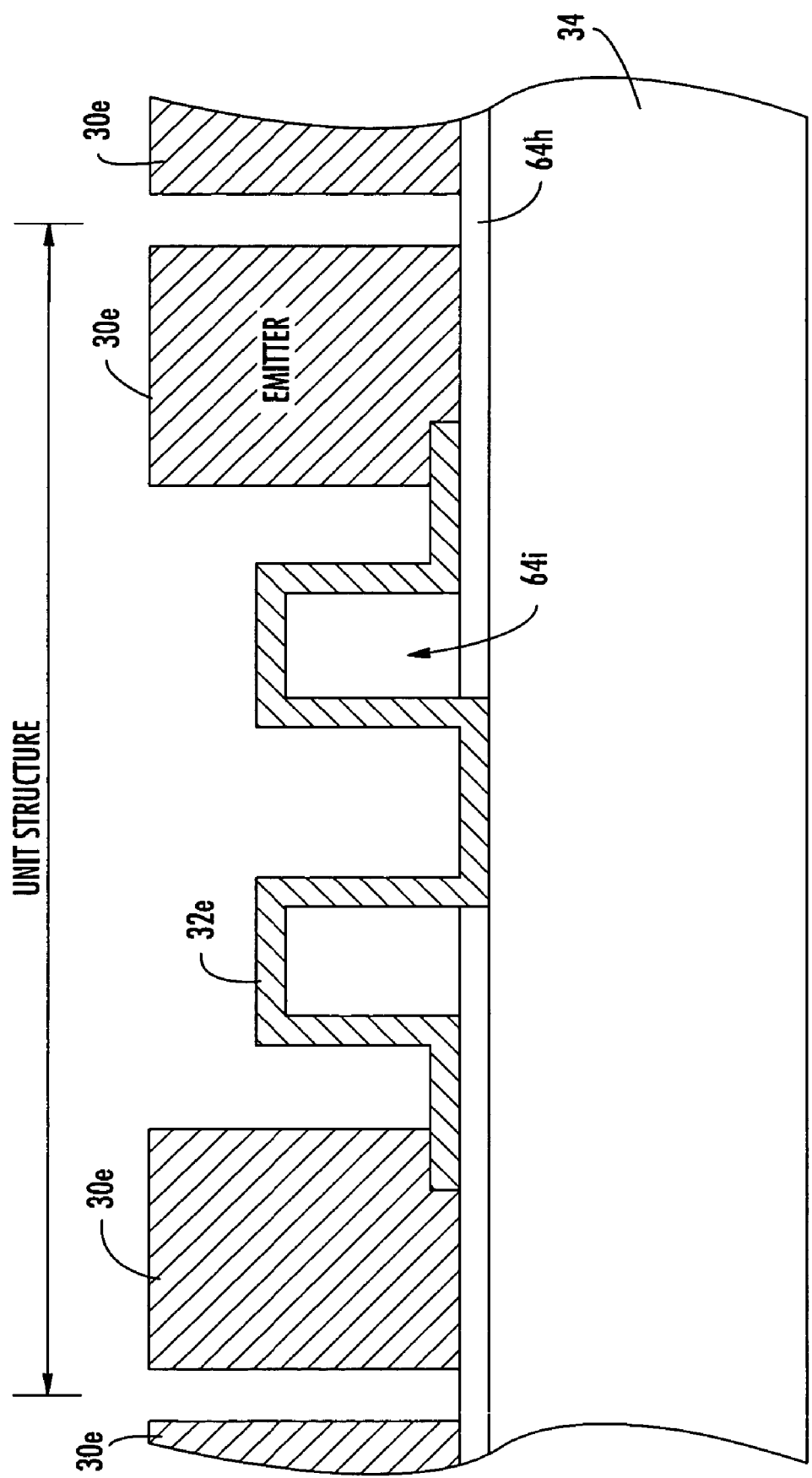
FIG. 11B is a schematic cross sectional view showing the use of two sacrificial layers in accordance with the method of manufacturing the device shown in FIG. 11A.

In the design of FIGS. 11A and 11B, two sacrificial layers 64h and 64i, FIG. 11B are used to form bellows-like standoff 30e. This design has a large thermal resistance because of the length of the thermal path from the photovoltaic cell contact to emitter 32e. The other advantage of a bellows structure is that it provides for lateral strain relief. Because of this feature and the fact that standoff 32e is of a sealed nature, it is possible to create a sealed surface design with this type of standoff. The structure would need weep holes which would have to be plugged in the final processing step. In a sealed structure, there would be no lateral gaps.

Figure 12A:
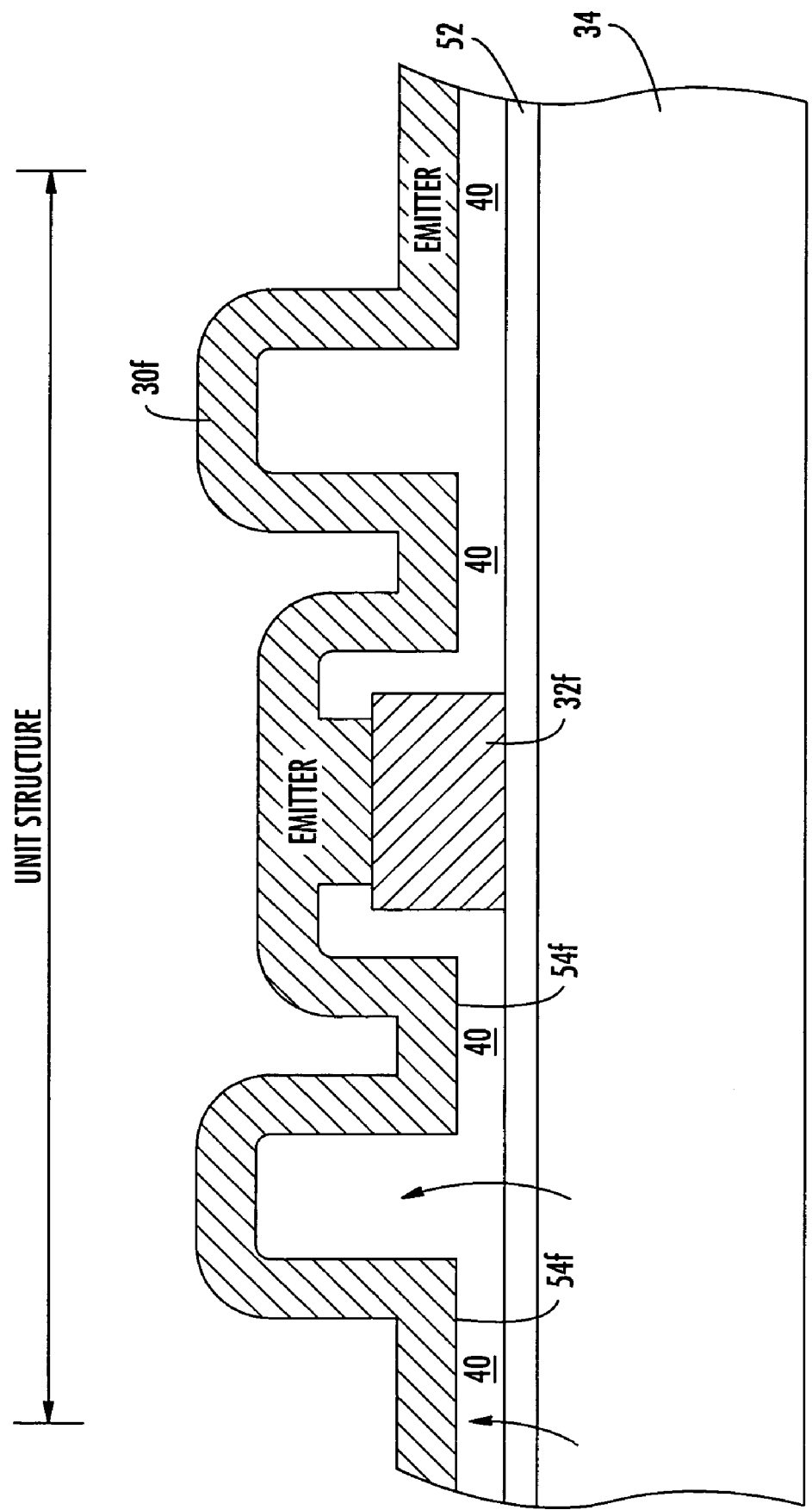
FIG. 12A is a schematic cross sectional view of a portion of a micron gap thermal photovoltaic device in accordance with the subject invention including a monolithically constructed emitter layer.
Figure 12B:
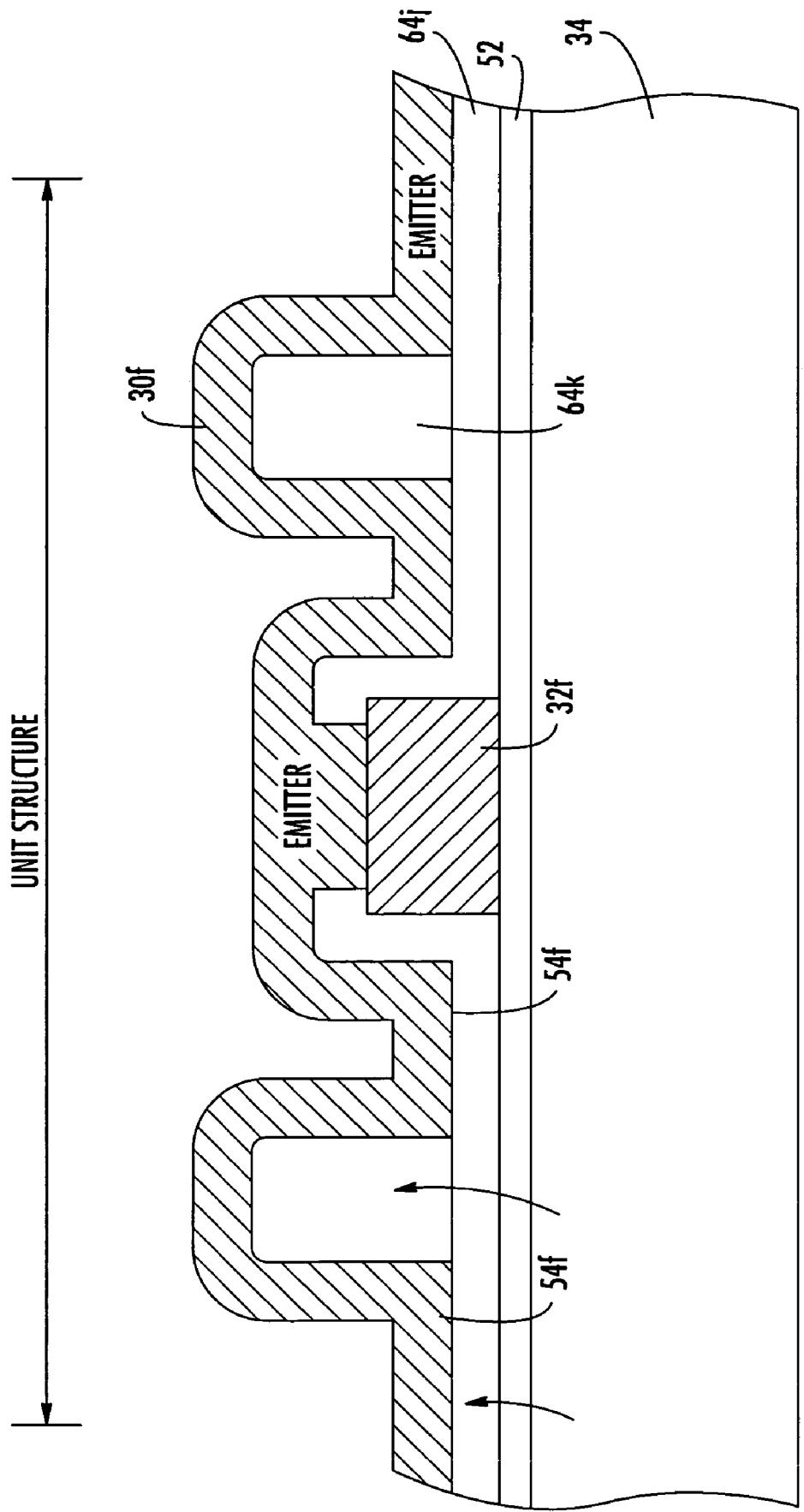
FIG. 12B is a schematic cross sectional view similar to FIG. 12A showing the use of two sacrificial layers used in manufacturing the device shown in FIG. 12A.

Thus far, numerous emitters have been shown separated by lateral gaps. In the design of FIG. 12A, in contrast, there are no lateral gaps. Instead, emitter 30f is monolithic in construction providing a sealed surface design. Sacrificial layers 64j and 64k, FIG. 12B, are etched through the weep holes (not shown). The weep holes are subsequently sealed by the deposition of a suitable material. The void left by the etching of the sacrificial material is maintained under vacuum atmosphere to lower the thermal transfer of low energy photons and to increase efficiency. The vacuum may be permanent in which case all of the weep holes are plugged. Alternatively, the weep holes are plugged where each device will come into contact with fluid and some of the outer weep holes are sealed off with a gasket and the void is mechanically pumped to maintain a vacuum. In order to use a sealed surface, lateral expansion must be accommodated for due to the elevated temperature of the hot side relative to the cold side as previously explained. One method of accomplishing this is to provide a construction which results in a bellows type fold in the emitter layer as shown for emitter 30f. The center of each unit is pinned by standoff 32f and the bellows expands and contracts as required by temperature changes. The bellows structure is formed by using second sacrificial layer 64k, FIG. 12B which is much thicker than first sacrificial layer 64j and is patterned as shown. When both sacrificial layers are etched, the bellows result is achieved. The second sacrificial layer 64k may be of a different material than first sacrificial layer 64j to simplify patterning it in the presence of the first.

Figure 13:
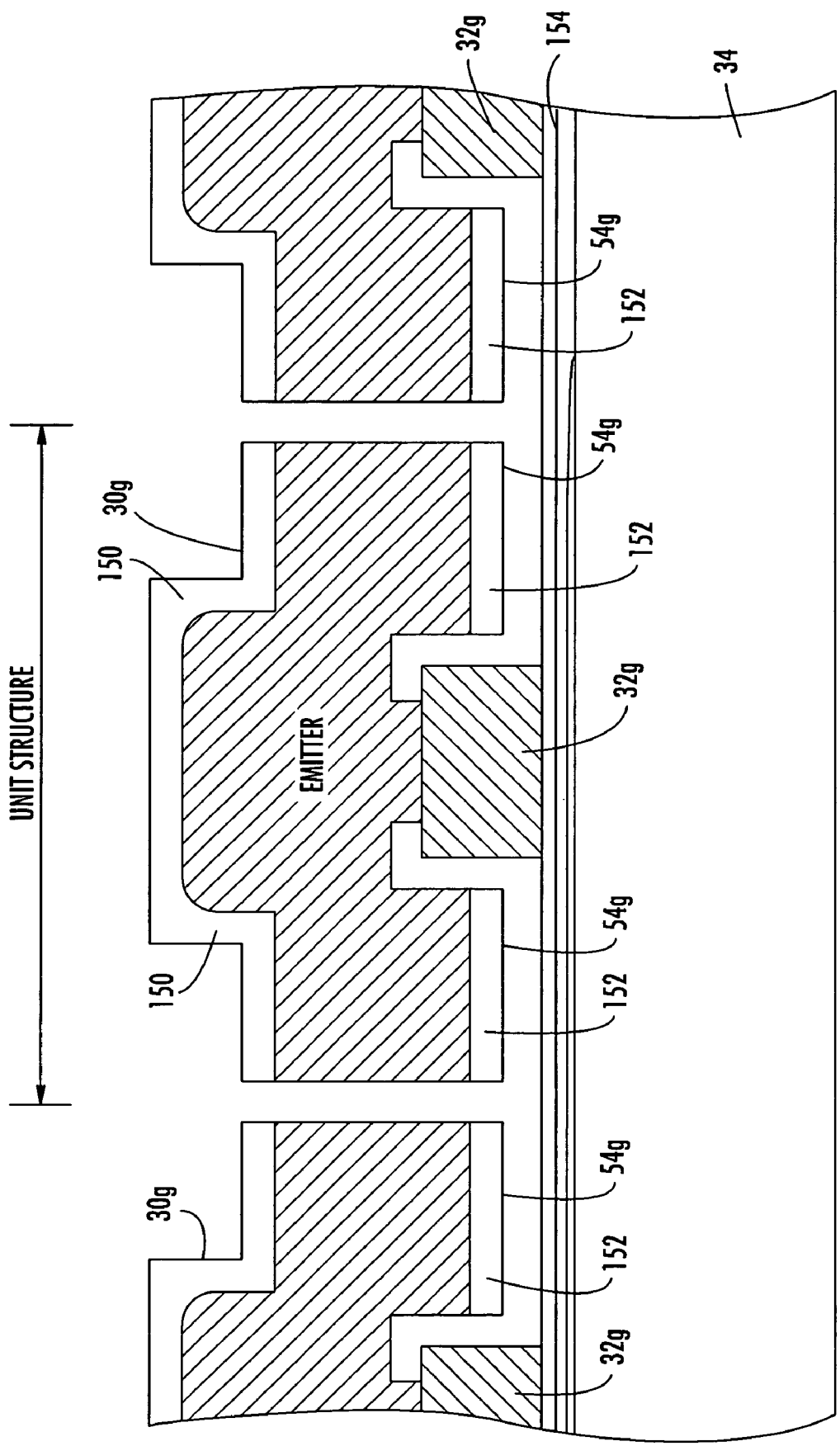
FIG. 13 is a schematic view of a portion of another embodiment of a micron gap thermal photovoltaic device in accordance with the subject invention including optional absorption and emitter layers on the emitter portion and also a multi-layer filter on the photovoltaic substrate.

In the embodiment shown in FIG. 13, emitter 30g is coated with carbon absorption layer 150 on the top surface thereof, to enhance the black body absorption of radiation in the infrared spectrum. To preserve thermal efficiency, a layer of this type becomes especially important if the emitter layer is not thick enough to totally absorb all of the incident radiation. Also, lower planar surface 54g includes emitter layer 152. This "selective emitter" layer is deposited just before the deposition of the emitter and becomes an integral part of the emitter. The purpose of selective emitter layer 152 is to improve the overall thermal efficiency of the device. Materials such as rare earth garnets have been shown to emit a higher proportion of high-energy photons than a black body and the incorporation of such a layer in a micron gap thermal photovoltaic structure as shown results in a better photon energy match than with the photovoltaic cell.

Finally, photovoltaic substrate 34 may include filter 154 thereon the top surface thereof to pass high energy photons and reflect low energy photons. The incorporation of such a filter in a micron gap thermal photovoltaic structure can improve thermal efficiency. The reflected low energy photons get absorbed by the emitter structure and are re-radiated in the black body spectrum. The net effect is a recycling of energy and an upgrading of the coupled energy into a higher energy range thereby providing a better spectral match with the photovoltaic cell and improving efficiency. See U.S. Pat. No. 5,611,870 incorporated herein by this reference.

Figure 14:
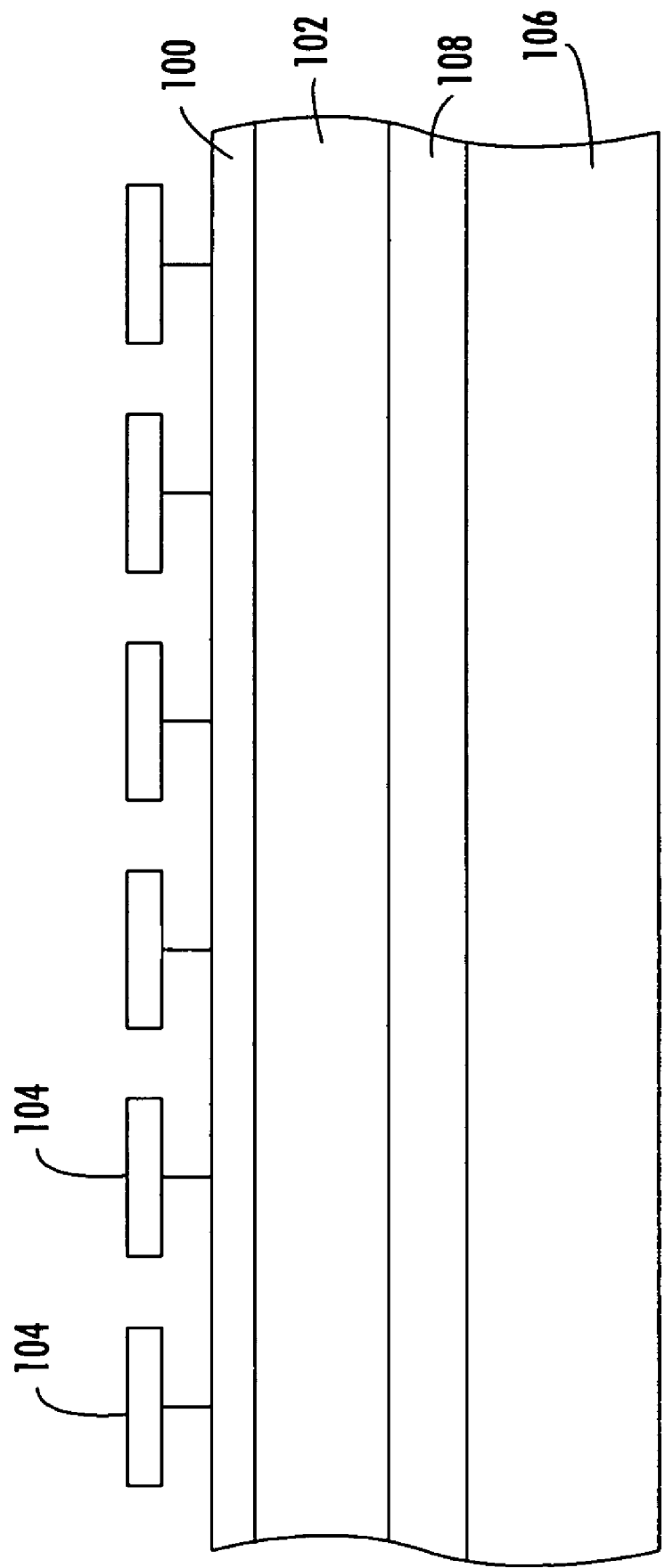
FIG. 14 is a schematic cross sectional view showing the addition of a filter layer to the device of this invention.

Alternatively the filter may be placed on an intermediate substrate transparent to the wavelength of interest as in FIG. 14.

FIG. 14 shows an intermediate substrate with a band pass filter layer 100 on the surfaces of substrate 102. Over the filter layers which is typically a very thin metal layer with sub-micron patterns, a series of emitter 104 are formed with sub-micron gaps to the filter surface. Any of the techniques previously discussed for creating the emitters may be used. Below the intermediate layer a series of photo voltaic cells 106 are attached. The attachment which might use an optical cement 108 or a low temperature glass must be optically transparent but does not have to have excellent thermal conductively may have a relatively large gap is greater than 1 micron. In operation, the emitters are hot and the photovoltaic cell and intermediate substrate are kept cool, approximately room temperature. In operation, the enhanced rate of emission takes place at the submicron gap interface. The enhanced spectral control is provided by the filter and the conversion of the photons to electricity by the photovoltaic cells.

The potential advantages for the configuration of FIG. 14 are that the intermediate layer can be chosen to withstand high processing temperature, be transparent to the wavelength of interest, and be very flat and of large area. The filter layer is very thin and causes little physical stress.

Moreover, the emitter structure can be formed on top of the filter with minimal processing restrictions such as temperature and time. This facilitates the building of thick rugged and flat emitters. And, multiple photovoltaic cells can be used and "tiled" together to fit the large area requirement. Because the incident photon flux has already been concentrated and spectrally confined, the interface to the photovoltaic cells is simplified. The gap can be greater than 1 micron and the only major requirement of the attachment is that it be optically transparent.

Figure 15A:
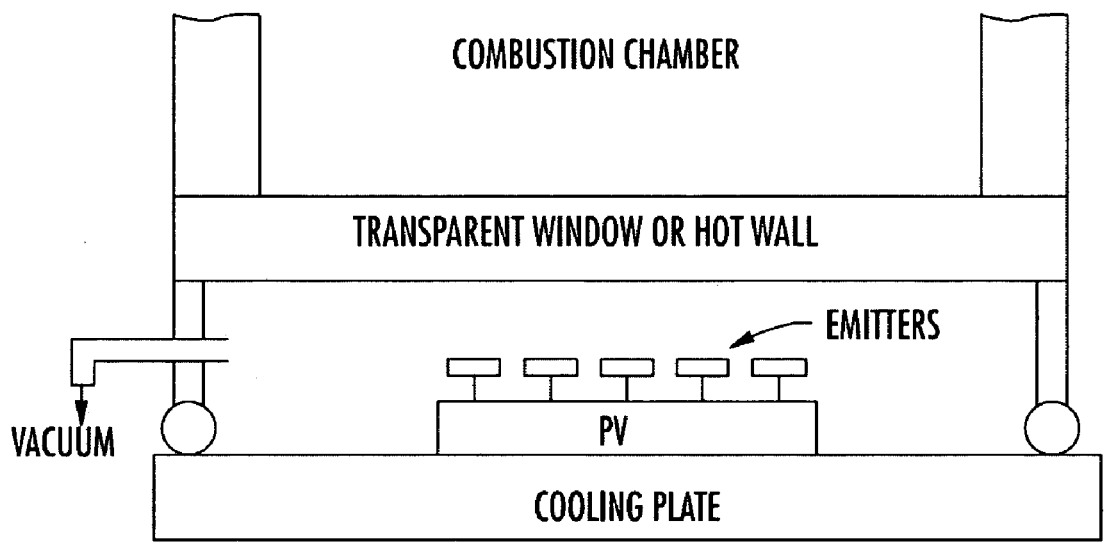
FIGS. 15A-15B are schematic cross sectional views shown hot side and cold side compliant systems, respectively, in accordance with this invention.
Figure 15B:
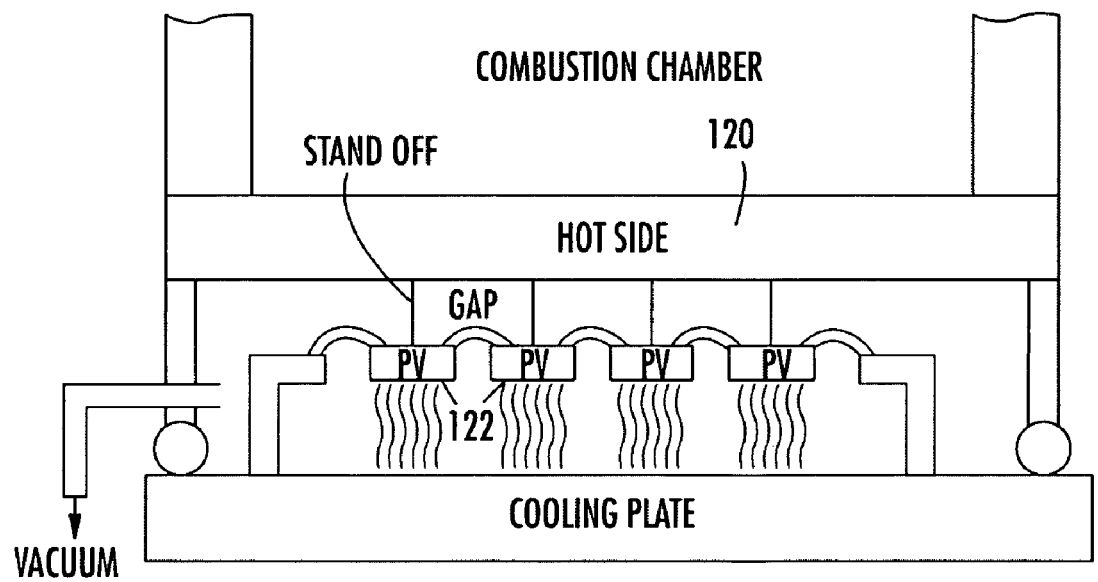

The MTPV systems described thus far have a set of compliant emitters suspended via the use of a sacrificial layer from a cold side PV substrate. The concept can be made to work the other way around as shown in FIG. 15 comparing the two methods of building a micron-gap system. The system of FIG. 15A is "hot side compliant" and shows the arrangement previously discussed. The system of FIG. 15B is "cold side compliant" and shows a single hot side emitter 120 with a series of PV cells 122 suspended by a similar use of sacrificial layers. The systems can be compared as follows. The system of FIG. 15A is mechanically simpler to construct as the compliant emitters have only the function of serving as a heat absorber suspended by sub-micron gap from the PV. This system also has an inherent efficiency loss as there are two hot surfaces, the wall of the chamber and the emitters themselves. This implicity requires a temperature drop between the chamber wall and the emitters to transfer the heat. For a given combustion process, the emitters of the system of FIG. 15A will operate at a lower temperature than those of the system of FIG. 15B and therefore at lower efficiency for that step.

The system of FIG. 15B has a simpler hot side but a more difficult PV construction. The cells must be broken up into small compliant pieces and there could be compatability issues with the sacrificial etch step. The electrical and cooling connections must also be compliant as the PV cells will expand and contract with the motion of the hot side. On the other hand, the temperatures are low and organic materials may be considered for construction. For example, it is possible to seal the spaces between the PV cells with a polymer membrane and use a cold fluid to simplify the cooling while not affecting the vacuum environment on the sub-micron gap side.

In general then, a more uniform sub-micron gap thermal photovoltaic device which is easier to manufacture is effected by the use of a sacrificial layer or layers between the emitter or emitters and their associated standoffs upstanding from the photovoltaic substrate when the sacrificial layer is removed by chemical etching techniques to form the sub-micron gap between the lower planar surfaces of the emitters and the photovoltaic substrate thus eliminating the problems associated with multi-piece construction methods of the prior art wherein discrete structures must be co-joined.

Although specific features of the invention are shown in some drawings and not in others, this is for convenience only as each feature may be combined with any or all of the other features in accordance with the invention. For example, the bellows-like structure of FIGS. 9 and 11; the cup like structure of FIGS. 8, 10; the arcuate structure of FIGS. 7, 8, 10, and 11; the floating standoffs of FIG. 9; the monolithic construction of FIG. 12; and the absorption, selective emitter, and filter layers of FIG. 13 can be selectively combined in other embodiments. Also, the words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A micron gap thermal photovoltaic device comprising:
a photovoltaic substrate;

a plurality of emitters separated from each other by a lateral gap and each having a lower planar surface closely spaced from the photovoltaic substrate defining a sub-micron gap between the photovoltaic substrate and the lower planar surface of each emitter; and at least one standoff upstanding from the photovoltaic substrate for each emitter supporting the emitter in a spaced relationship from the photovoltaic substrate, each emitter including a stem section which resides on a standoff.

2. The device of claim 1 in which there is a single standoff for each emitter.

3. The device of claim 2 in which the single standoff is centrally located with respect to the emitter.

4. The device of claim 1 in which there are a plurality of standoffs upstanding from the photovoltaic substrate for each emitter.

5. The device of claim 1 in which the photovoltaic substrate is made of InAs, InP, InSb, GaSb, or InGaAs.

6. The device of claim 1 in which the photovoltaic substrate includes a silicon nitride coating thereon below emitters.

7. The device of claim 1 in which the emitters are made of a rigid material.

8. The device of claim 7 in which the emitters are made of polysilicon.

9. The device of claim 1 in which each standoff is made of a material which is thermally insulative.

10. The device of claim 8 in which each standoff of made of silicon dioxide.

11. The device of claim 1 in which the photovoltaic substrate has a perimeter ranging from a few inches to several feet.

12. The device of claim 1 in which each emitter has a perimeter ranging from less than a millimeter to several millimeters and a thickness of between 10 to over 100 microns.

13. The device of claim 1 in which each standoff has a perimeter less than 300 microns and a height of between 1 to 5 microns.

14. The device of claim 1 in which the sub-micron gap is less than 1 micron.

15. The device of claim 1 in which each emitter is polygon shaped.

16. The device of claim 1 in which the emitter is coated with an absorptive layer on a surface thereof opposite the lower planar surface of the emitter.

17. The device of claim 16 in which the absorptive layer is carbon.

18. The device of claim 1 in which the lower planar surface of the emitter includes a selectively emissive layer.

19. The device of claim 18 in which the emissive layer is made of a rare earth garnet material.

20. The device of claim 1 in which the photovoltaic substrate includes a spectral filter thereon adjacent the sub-micron gap.

21. A micron gap thermal photovoltaic device comprising:
a photovoltaic substrate;
at least one emitter having a lower planar surface closely spaced from the photovoltaic substrate defining a sub-micron gap between the photovoltaic substrate and the lower planar surface of the emitter; and
at least one standoff upstanding from the photovoltaic substrate for the emitter supporting the emitter in a spaced relationship from the photovoltaic substrates, the emitter including a stem section which resides on a standoff.

22. The device of claim 21 in which there is a single standoff for the emitter.

23. The device of claim 22 in which the single standoff is centrally located with respect to the emitter.

24. The device of claim 21 in which there are a plurality of standoffs upstanding from the photovoltaic substrate for the emitter.

25. A micron gap thermal photovoltaic device comprising:
a photovoltaic substrate;
at least one standoff formed on the photovoltaic substrate to be upstanding from the photovoltaic substrate;
at least one emitter including a stem section which resides on the standoff, said emitter attached to the standoff and patterned to have a lower planar surface separated from the photovoltaic substrate by a sacrificial layer which is removed defining a sub-micron gap between the photovoltaic substrate and the lower planar surface of the emitter.

26. The device of claim 25 in which there are a plurality of emitters each separated from each other by a lateral gap.

27. The device of claim 26 in which there is a single standoff for each emitter.

28. The device of claim 25 in which the standoff is centrally located with respect to the emitter.

29. The device of claim 25 in which there are a plurality of standoffs upstanding from the photovoltaic substrate for the emitter.

30. A micron gap thermal photovoltaic device comprising:
a photovoltaic substrate;
at least one emitter having a lower planar surface closely spaced from the photovoltaic substrate defining a sub-micron gap between the photovoltaic substrate and the lower planar surface of the emitter; and
at least one standoff upstanding from the photovoltaic substrate for the emitter supporting the emitter in a spaced relationship from the photovoltaic substrate, the emitter having a stem which resides on the standoff.

31. A micron gap thermal photovoltaic device comprising:
a photovoltaic substrate;
at least one emitter having a lower planar surface closely spaced from the photovoltaic substrate defining a sub-micron gap between the photovoltaic substrate and the lower planar surface of the emitter; and
at least one standoff upstanding from the photovoltaic substrate for the emitter supporting the emitter in a spaced relationship from the photovoltaic substrate, the at least one standoff having a central region and the emitter having an orifice over the central region of the standoff.

32. A micron gap thermal photovoltaic device comprising:
a photovoltaic substrate;
at least one emitter having a lower planar surface closely spaced from the photovoltaic substrate defining a sub-micron gap between the photovoltaic substrate and the lower planar surface of the emitter; and
at least one standoff upstanding from the photovoltaic substrate for the emitter supporting the emitter in a spaced relationship from the photovoltaic substrate, the at least one standoff having a cup-like structure and an outwardly extending arcuate region attached to the emitter.

33. The device of claim 32 in which the outwardly extending arcuate region is attached to the emitter on a surface thereof opposite the lower planar surface of the emitter.

34. A micron gap thermal photovoltaic device comprising:
a photovoltaic substrate;
at least one emitter having a lower planar surface closely spaced from the photovoltaic substrate defining a sub-micron gap between the photovoltaic substrate and the lower planar surface of the emitter;
at least one standoff upstanding from the photovoltaic substrate for the emitter supporting the emitter in a spaced relationship from the photovoltaic substrate; and a plurality of floating standoffs extending from the emitter and spaced from the photovoltaic device.

35. A micron gap thermal photovoltaic device comprising:
a photovoltaic substrate;
at least one emitter having a bellows-like configuration and having a lower planar surface closely spaced from the photovoltaic substrate defining a sub-micron gap between the photovoltaic substrate and the lower planar surface of the emitter; and
at least one standoff upstanding from the photovoltaic substrate for the emitter supporting the emitter in a spaced relationship from the photovoltaic substrate.

36. A micron gap thermal photovoltaic device comprising:
a photovoltaic substrate;
a plurality of emitters separated from each other by a lateral gap and each having a lower planar surface closely spaced from the photovoltaic substrate defining a sub-micron gap between the photovoltaic substrate and the lower planar surface of each emitter; and
at least one standoff upstanding from the photovoltaic substrate for each emitter supporting the emitter in a spaced relationship from the photovoltaic substrate, each standoff including a central region and each emitter including an orifice over the central region of the standoff.

37. A micron gap thermal photovoltaic device comprising:
a photovoltaic substrate;
a plurality of emitters separated from each other by a lateral gap and each having a lower planar surface closely spaced from the photovoltaic substrate defining a sub-micron gap between the photovoltaic substrate and the lower planar surface of each emitter; and
at least one standoff upstanding from the photovoltaic substrate for each emitter supporting the emitter in a spaced relationship from the photovoltaic substrate, each standoff including a cup-like structure and an outwardly extending arcuate region attached to the emitter.

38. The device of claim 37 in which the outwardly extending arcuate region is attached to the emitter on a surface thereof opposite the lower planar surface of the emitter.

39. A micron gap thermal photovoltaic device comprising:
a photovoltaic substrate;
a plurality of emitters each having a bellows-like construction separated from each other by a lateral gap and each having a lower planar surface closely spaced from the photovoltaic substrate defining a sub-micron gap between the photovoltaic substrate and the lower planar surface of each emitter; and
at least one standoff upstanding from the photovoltaic substrate for each emitter supporting the emitter in a spaced relationship from the photovoltaic substrate.

40. A micron gap thermal photovoltaic device comprising:
a photovoltaic substrate;
a plurality of emitters separated from each other by a lateral gap and each having a lower planar surface closely spaced from the photovoltaic substrate defining a sub-micron gap between the photovoltaic substrate and the lower planar surface of each emitter;
at least one standoff upstanding from the photovoltaic substrate for each emitter supporting the emitter in a spaced relationship from the photovoltaic substrate; and
a plurality of floating standoffs extending from each emitter and spaced from the photovoltaic substrate.

41. A micron gap thermal photovoltaic device comprising:
a photovoltaic substrate;
at least one standoff formed on the photovoltaic substrate to be upstanding from the photovoltaic substrate;
at least one emitter attached to the standoff and patterned to have a lower planar surface separated from the photovoltaic substrate by a sacrificial layer which is removed defining a sub-micron gap between the photovoltaic substrate and the lower planar surface of the emitter, the standoff including a central region and the emitter including an orifice over the central region of the standoff.

42. A micron gap thermal photovoltaic device comprising:
a photovoltaic substrate;
at least one standoff formed on the photovoltaic substrate to be upstanding from the photovoltaic substrate;
at least one emitter attached to the standoff and patterned to have a lower planar surface separated from the photovoltaic substrate by a sacrificial layer which is removed defining a sub-micron gap between the photovoltaic substrate and the lower planar surface of the emitter, the standoff including a cup-like structure and an outwardly extending arcuate region attached to the emitter.

43. The device of claim 42 in which the outwardly extending arcuate region is attached to the emitter on a surface thereof opposite the lower planar surface of the emitter.

44. A micron gap thermal photovoltaic device comprising:
a photovoltaic substrate;
at least one standoff formed on the photovoltaic substrate to be upstanding from the photovoltaic substrate;
at least one emitter attached to the standoff and patterned to have a lower planar surface separated from the photovoltaic substrate by a sacrificial layer which is removed defining a sub-micron gap between the photovoltaic substrate and the lower planar surface of the emitter; and
a plurality of floating standoffs extending from the emitter and spaced from the photovoltaic substrate.

45. A micron gap thermal photovoltaic device comprising:
a photovoltaic substrate;
at least one standoff formed on the photovoltaic substrate to be upstanding from the photovoltaic substrate;
at least one emitter having a bellows-like construction attached to the standoff and patterned to have a lower planar surface separated from the photovoltaic substrate by a sacrificial layer which is removed defining a sub-micron gap between the photovoltaic substrate and the lower planar surface of the emitter.

* * * * *